(No Model.) 16 Sheets—Sheet 1.

J. P. WRIGHT.
MACHINE FOR MAKING MATCHES.

No. 586,890. Patented July 20, 1897.

Witnesses:
Jas. E. Hutchinson.
Henry C. Hazard.

Inventor.
Jacob P. Wright, by
Prindle and Russell, his attys.

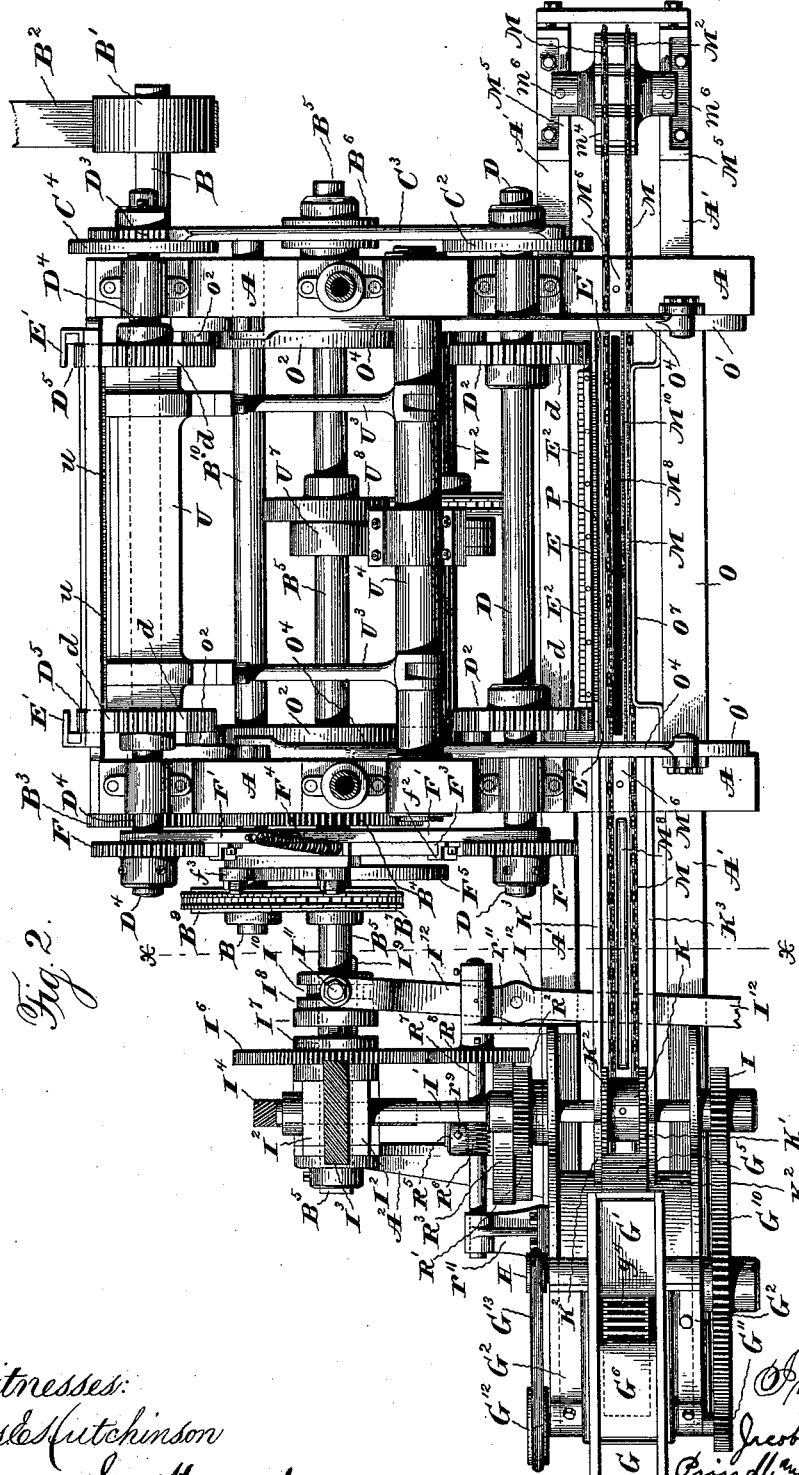

(No Model.)
16 Sheets—Sheet 3.
J. P. WRIGHT.
MACHINE FOR MAKING MATCHES.
No. 586,890. Patented July 20, 1897.
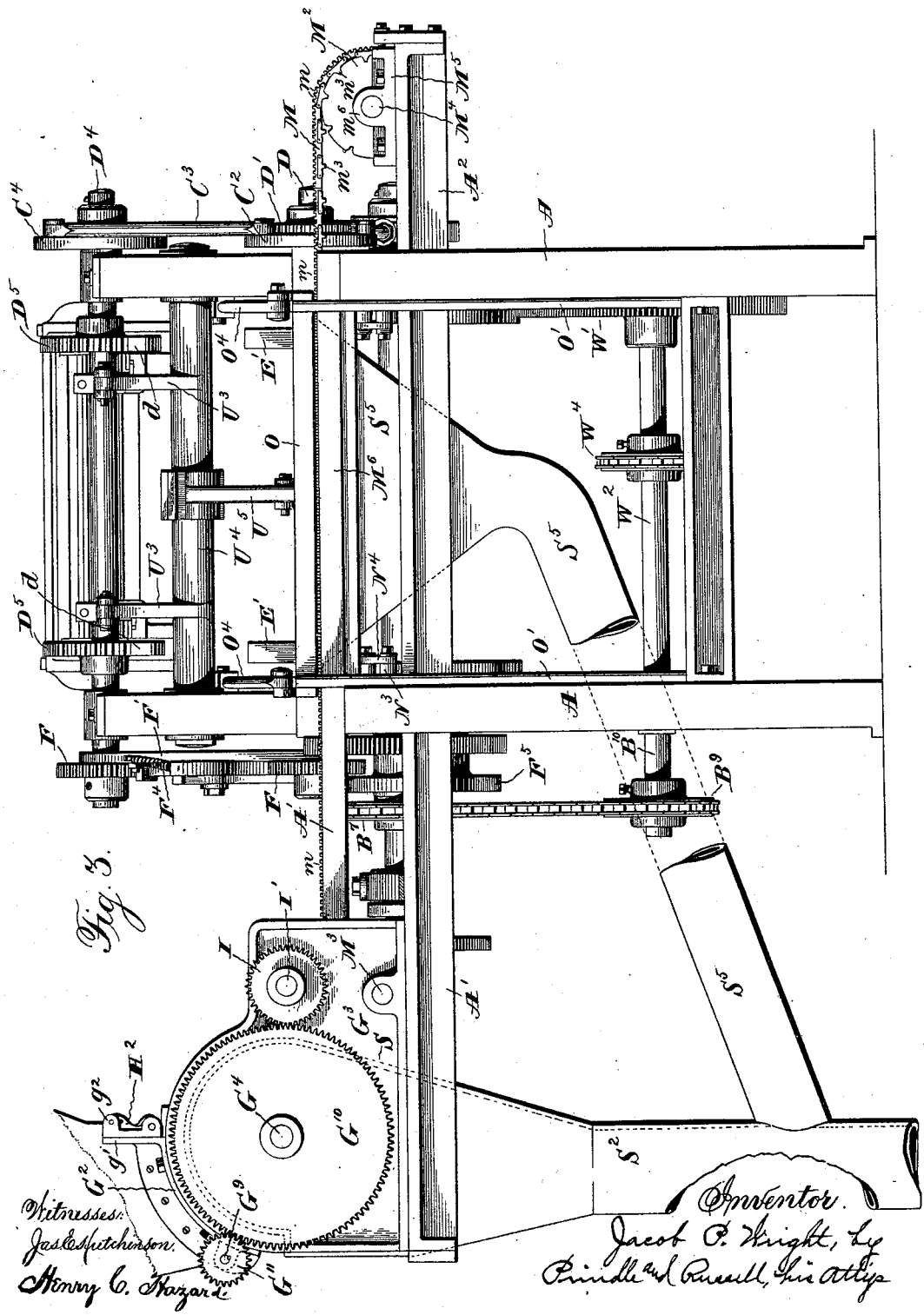

(No Model.)
J. P. WRIGHT.
MACHINE FOR MAKING MATCHES.
No. 586,890.   Patented July 20, 1897.
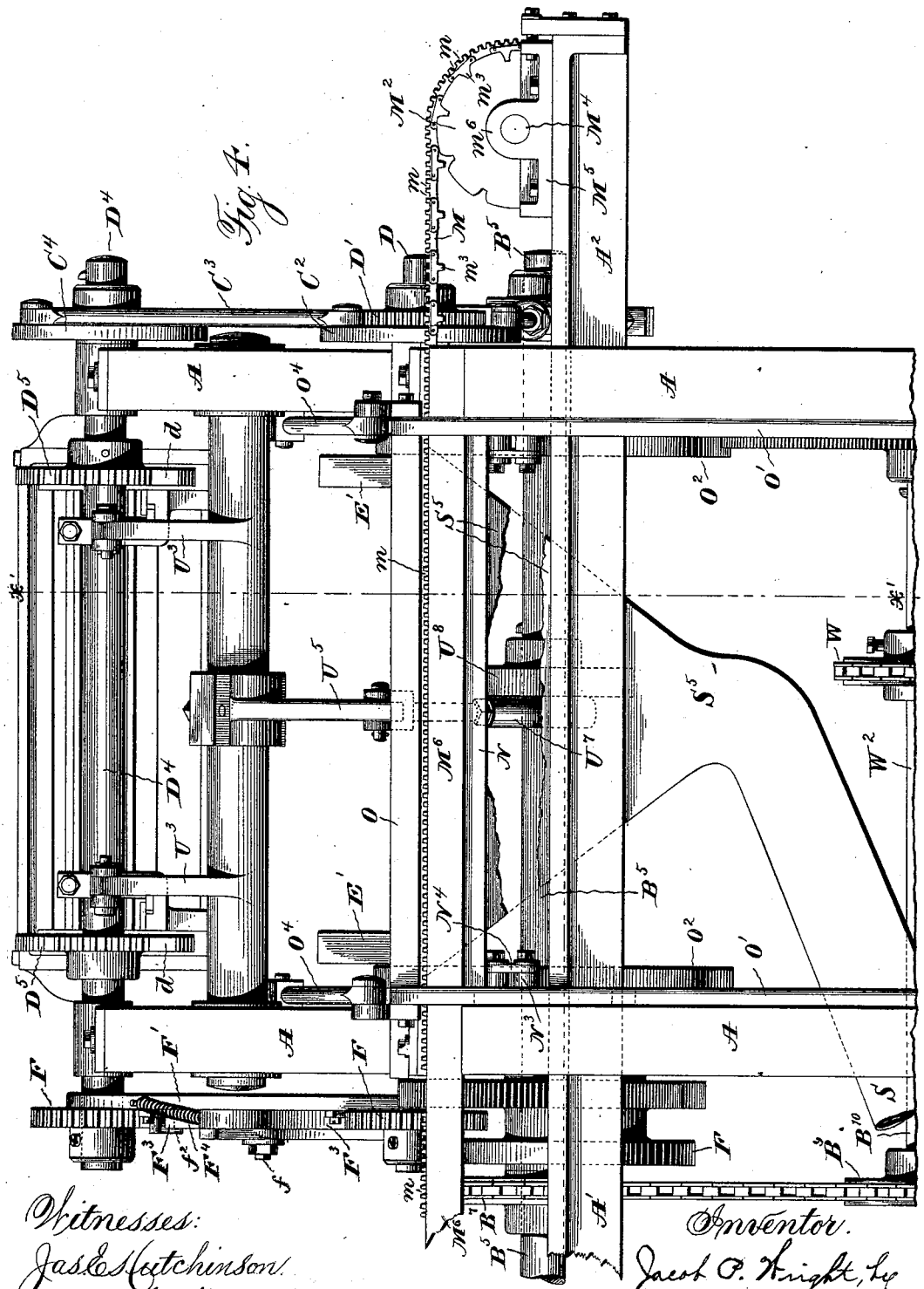
Witnesses:
Jas. E. Hutchinson
Henry C. Hazard
Inventor.
Jacob P. Wright,
Prindle & Russell, his attys.

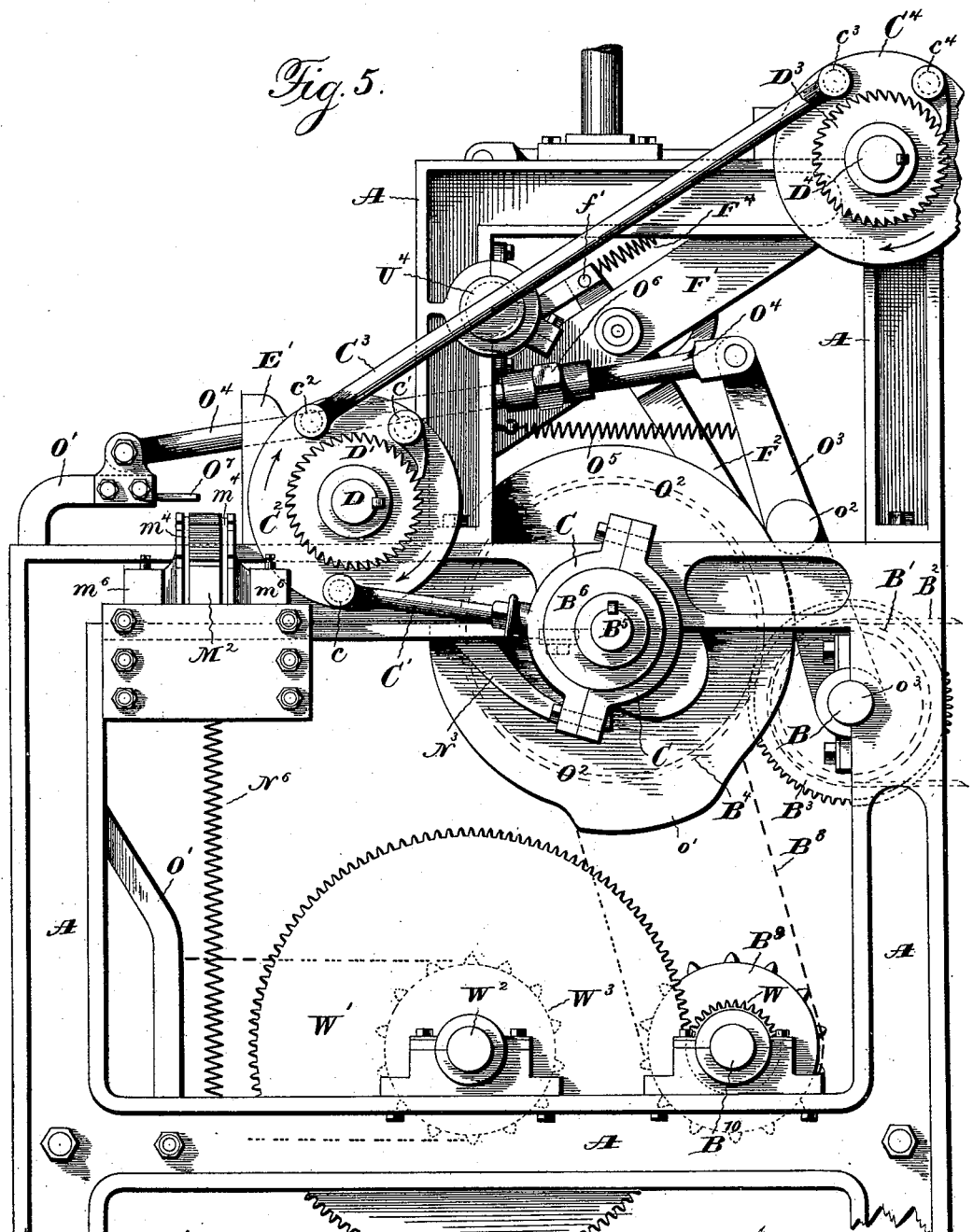

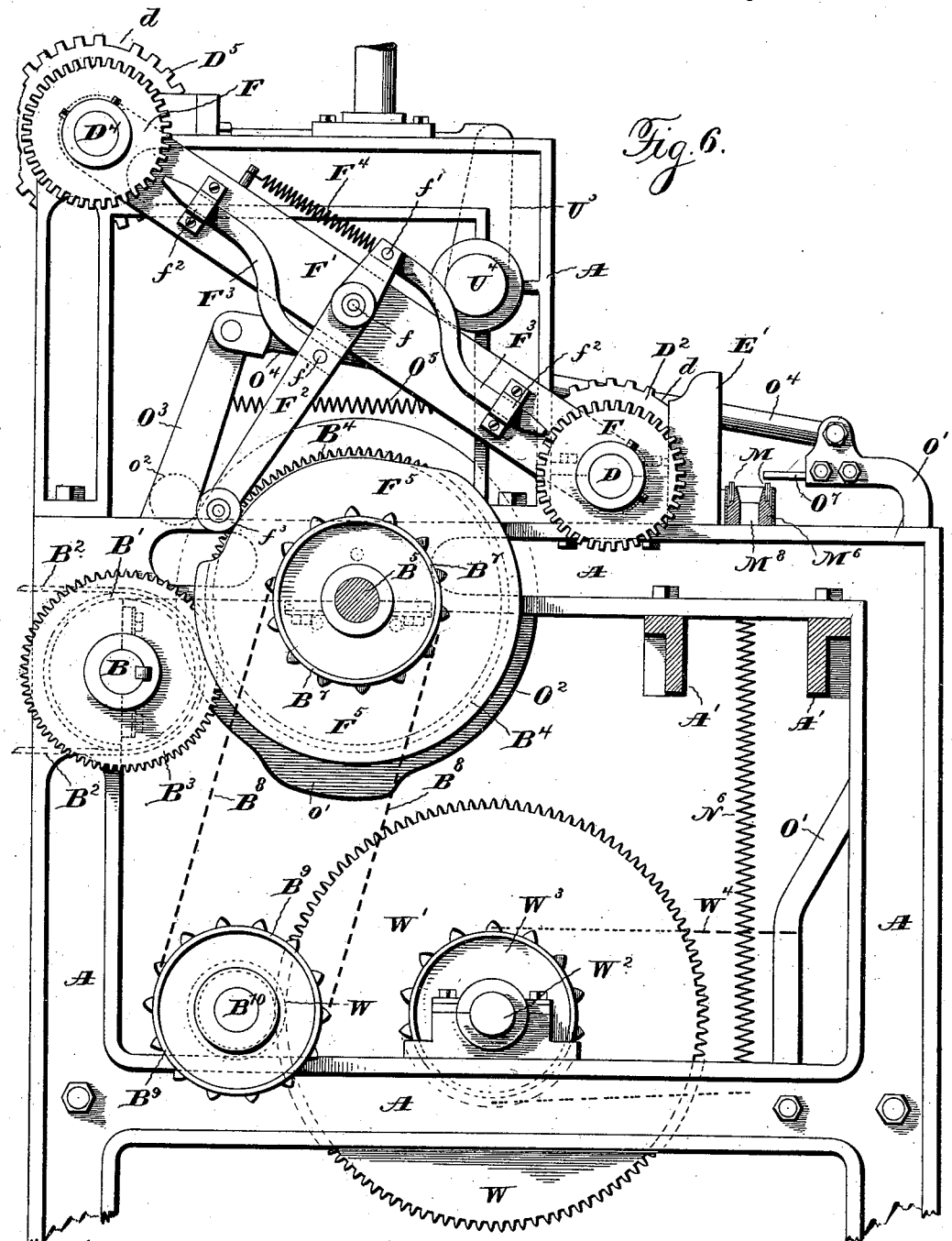

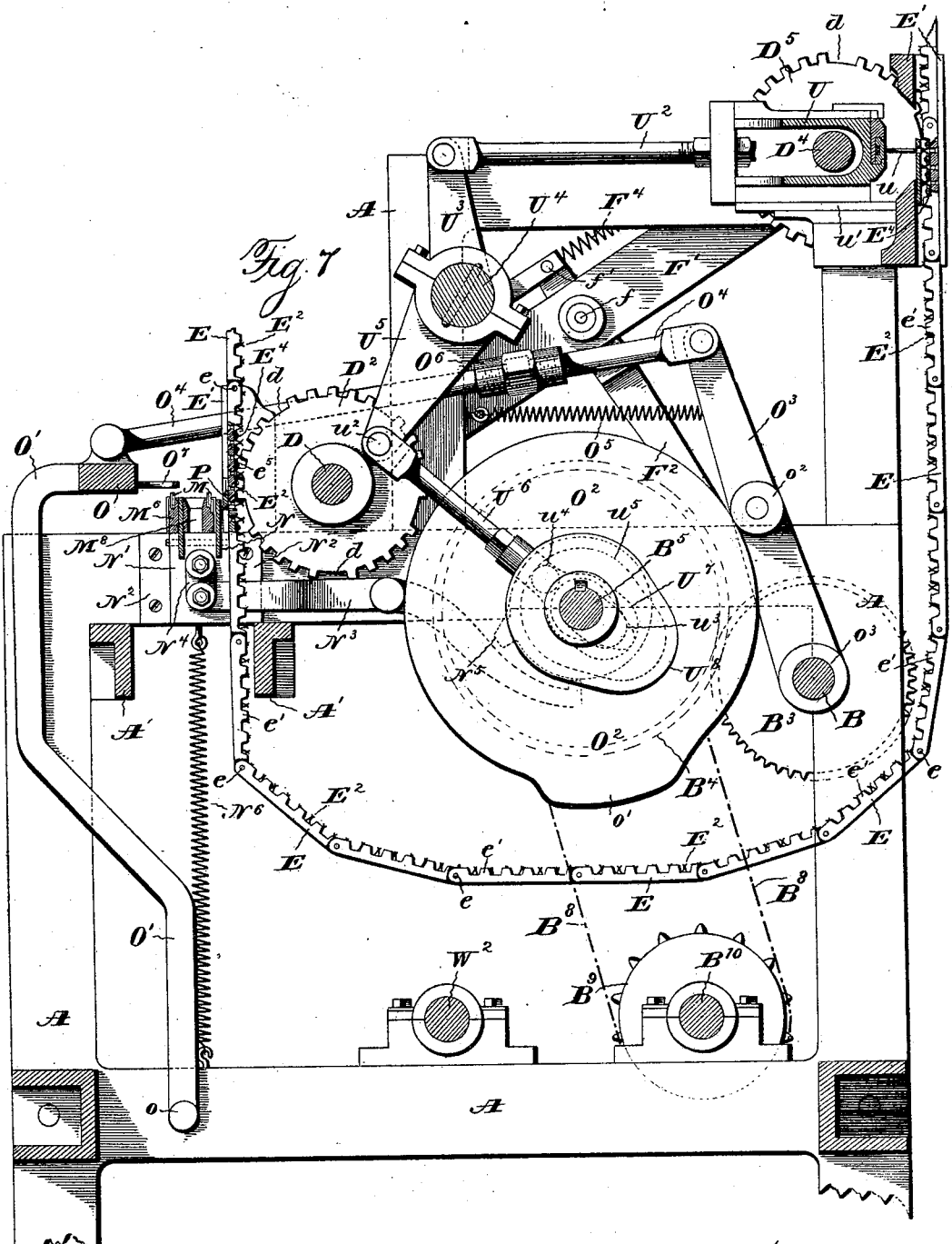

(No Model.) 16 Sheets—Sheet 8.
J. P. WRIGHT.
MACHINE FOR MAKING MATCHES.
No. 586,890. Patented July 20, 1897.
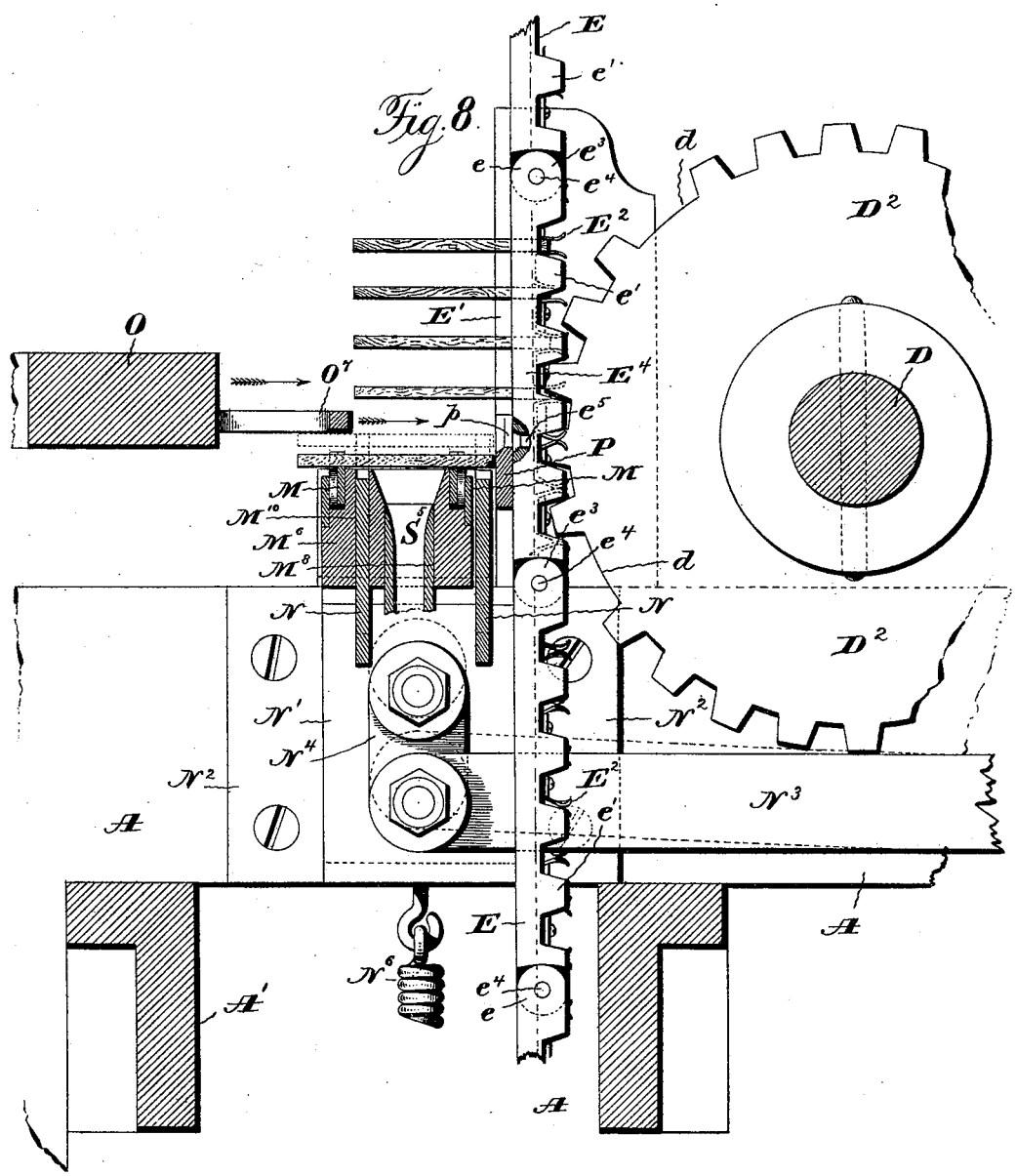
Witnesses:
Jas. E. Hutchinson.
Henry C. Hazard.
Inventor.
Jacob P. Wright, by
Prindle and Russell, his Attys.

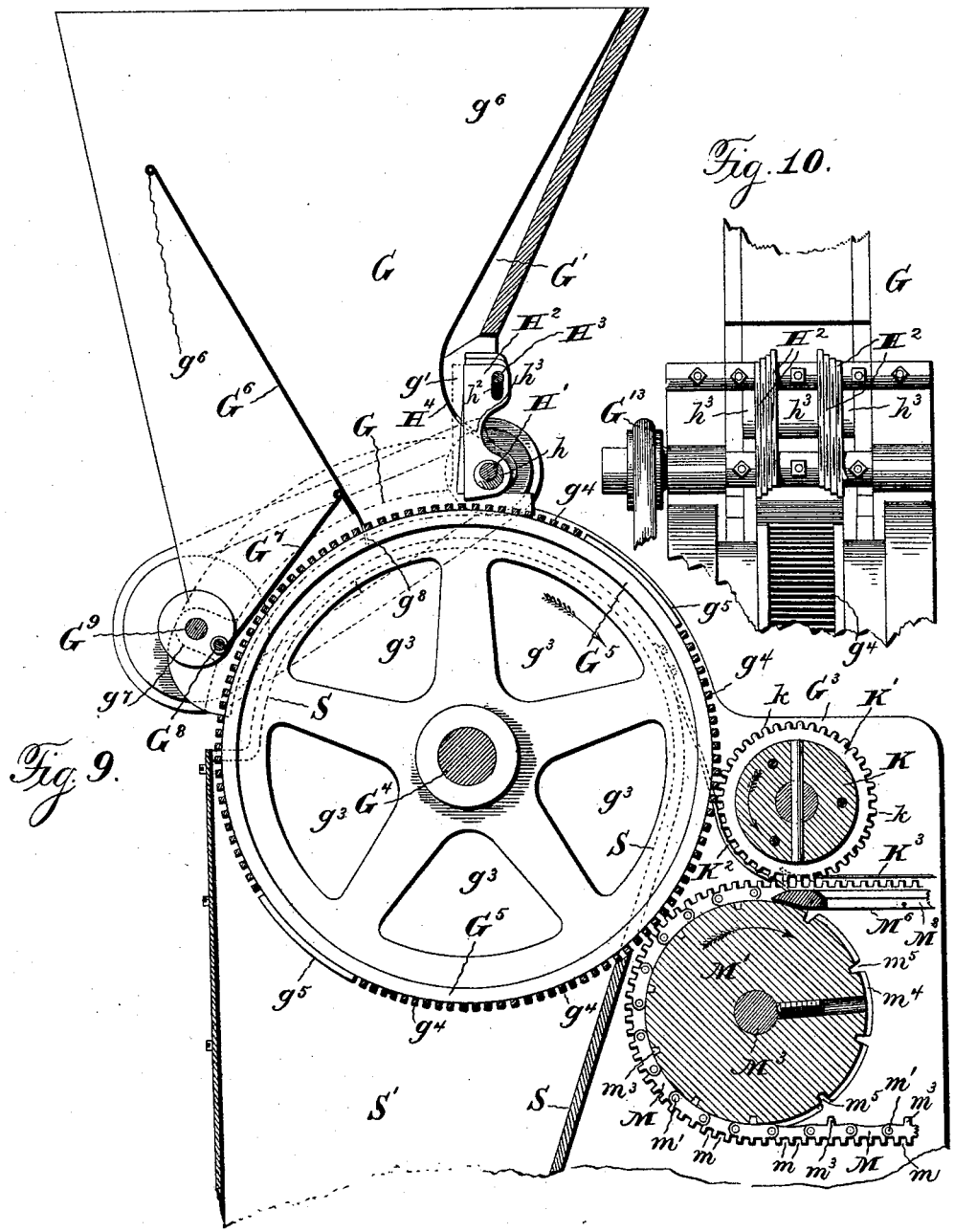

(No Model.) 16 Sheets—Sheet 10.
J. P. WRIGHT.
MACHINE FOR MAKING MATCHES.
No. 586,890. Patented July 20, 1897.
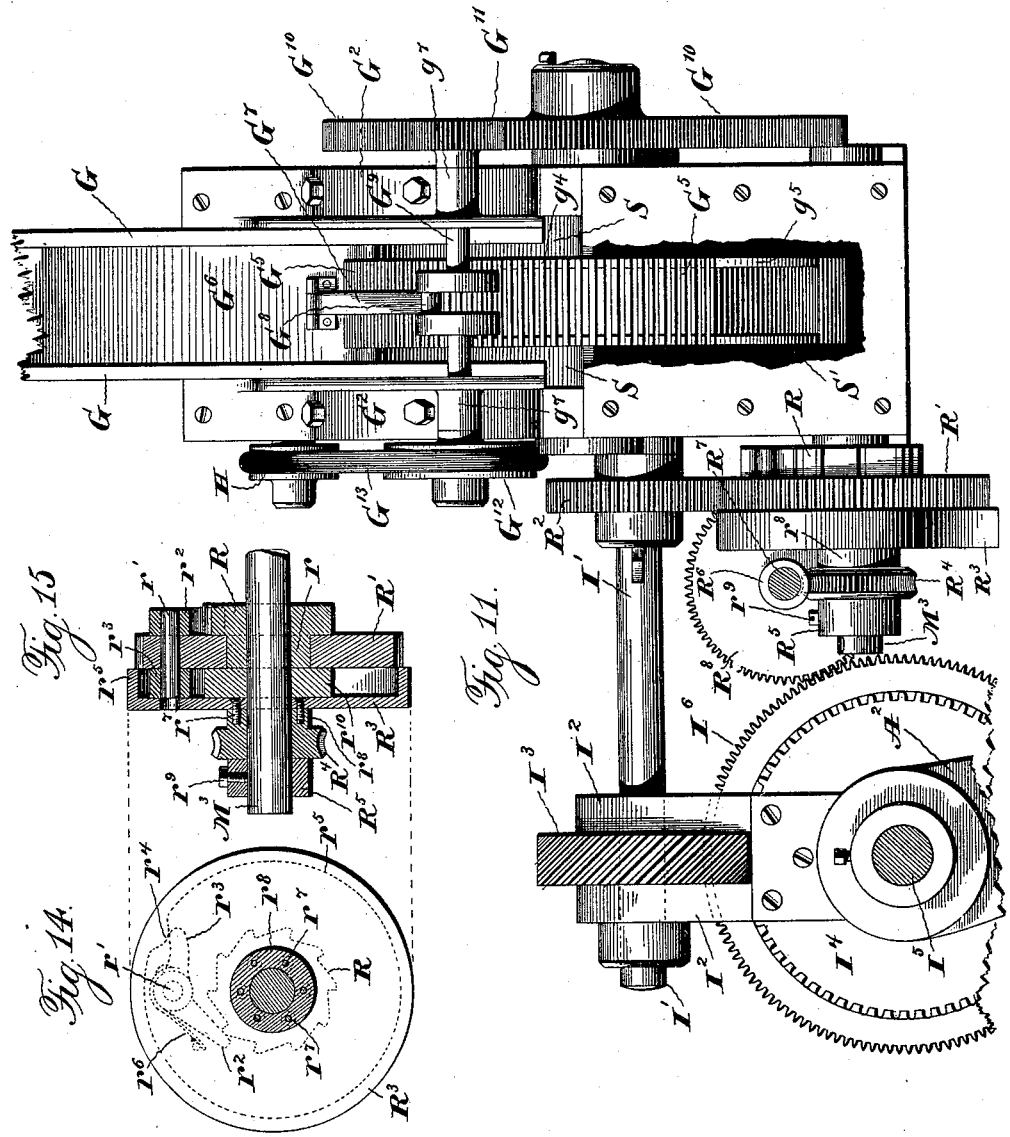
Witnesses:
Jas. E. Hutchinson
Henry C. Hazard
Inventor.
Jacob P. Wright, by
Brindle and Russell, his Attys (No Model.) 16 Sheets—Sheet 11.
J. P. WRIGHT.
MACHINE FOR MAKING MATCHES.
No. 586,890. Patented July 20, 1897.
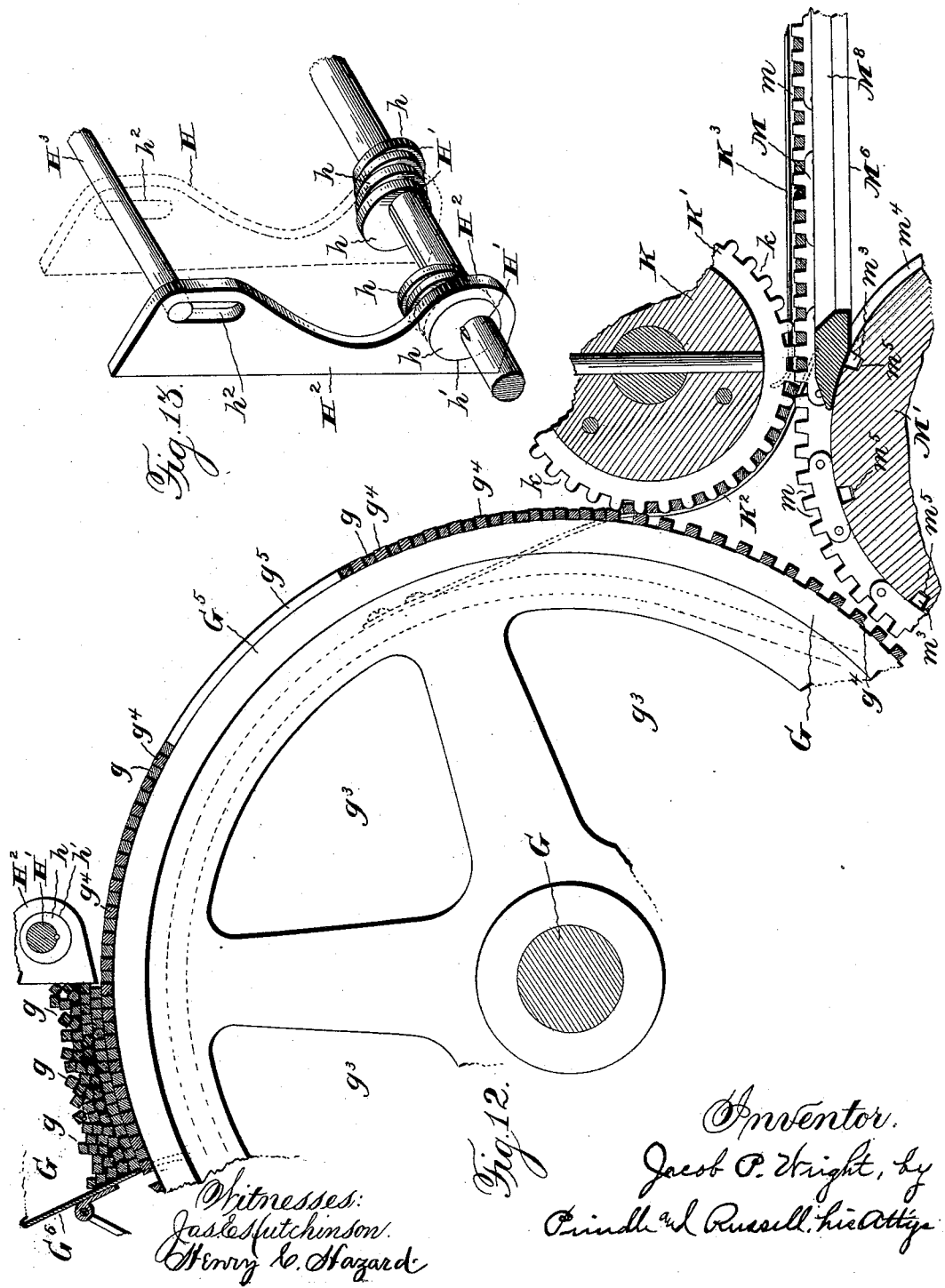

(No Model.) 16 Sheets—Sheet 12.

J. P. WRIGHT.
MACHINE FOR MAKING MATCHES.

No. 586,890. Patented July 20, 1897.

Witnesses:
Jas. E. Hutchinson.
Henry C. Hazard.

Inventor.
Jacob P. Wright, by
Prindle and Russell his Attys (No Model.) 16 Sheets—Sheet 13.
J. P. WRIGHT.
MACHINE FOR MAKING MATCHES.

No. 586,890. Patented July 20, 1897.

Witnesses:
Jas. E. Hutchinson.
Henry C. Hazard.

Inventor.
Jacob P. Wright, by
Prindle and Russell, his Attys (No Model.) 16 Sheets—Sheet 14.

J. P. WRIGHT.
MACHINE FOR MAKING MATCHES.

No. 586,890. Patented July 20, 1897.

Witnesses:
Jas. E. Hutchinson
Henry C. Hazard

Inventor.
Jacob P. Wright, by
Prindle & Russell, his attys (No Model.) 16 Sheets—Sheet 15.
J. P. WRIGHT.
MACHINE FOR MAKING MATCHES.
No. 586,890. Patented July 20, 1897.
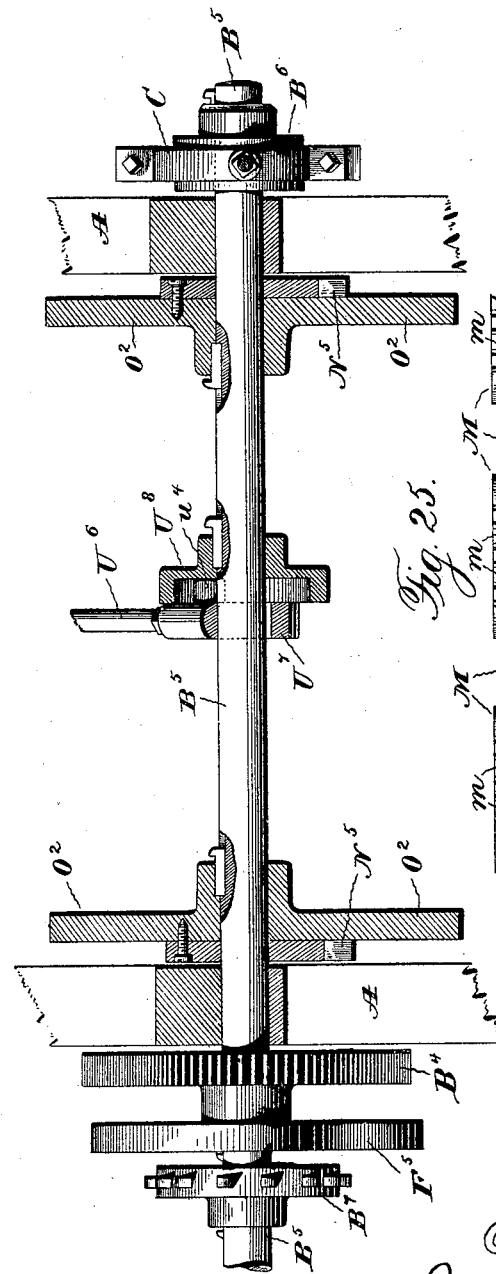

(No Model.) 16 Sheets—Sheet 16.
J. P. WRIGHT.
MACHINE FOR MAKING MATCHES.
No. 586,890. Patented July 20, 1897.
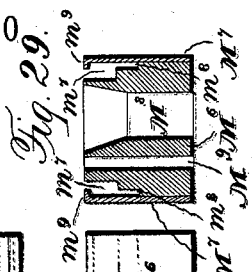
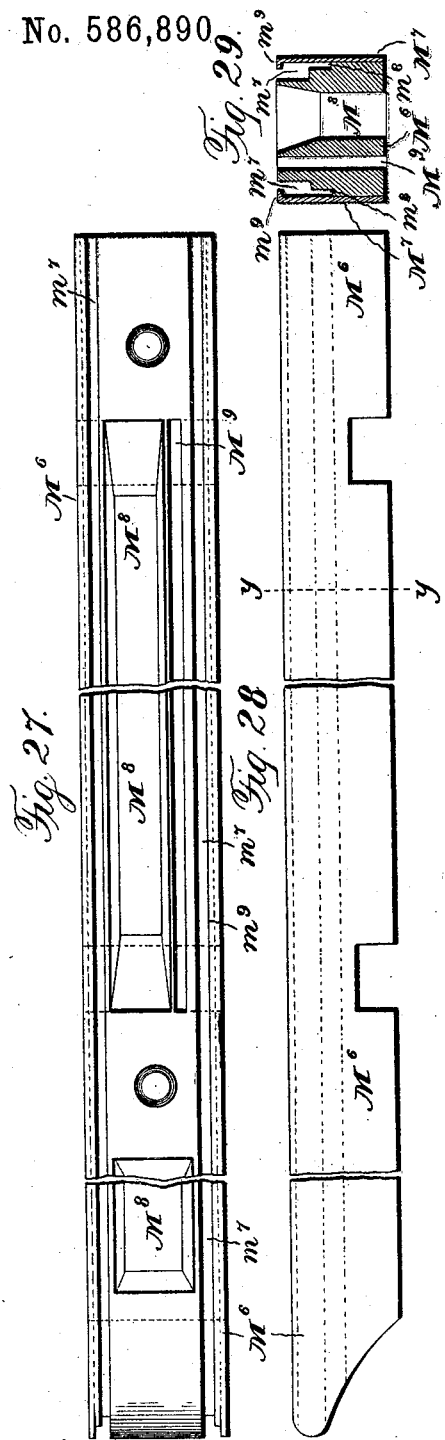
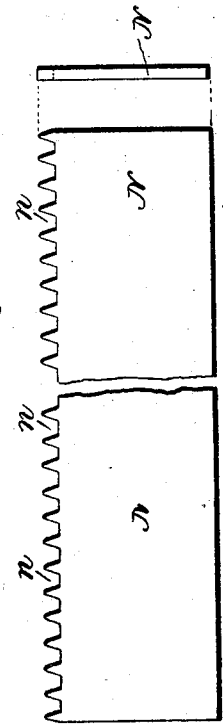
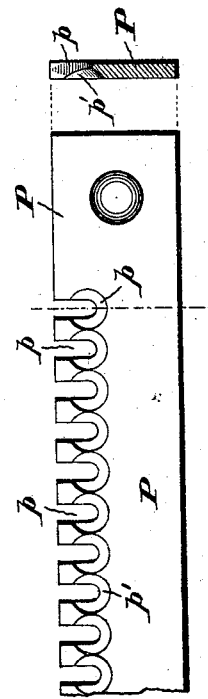
Witnesses:
Jas. E. Hutchinson
Henry C. Hazard
Inventor.
Jacob P. Wright, by
Prindle and Russell, his attys.

UNITED STATES PATENT OFFICE.

JACOB P. WRIGHT, OF NEW HAVEN, CONNECTICUT, ASSIGNOR TO THE DIAMOND MATCH COMPANY, OF CHICAGO, ILLINOIS.

MACHINE FOR MAKING MATCHES.

SPECIFICATION forming part of Letters Patent No. 586,890, dated July 20, 1897.

Application filed May 12, 1896. Serial No. 591,273. (No model.)

*To all whom it may concern:*

Be it known that I, JACOB P. WRIGHT, of New Haven, in the county of New Haven, and in the State of Connecticut, have invented certain new and useful Improvements in Machines for Making Matches; and I do hereby declare that the following is a full, clear, and exact description thereof, reference being had to the accompanying drawings, in which—

Figure 1:
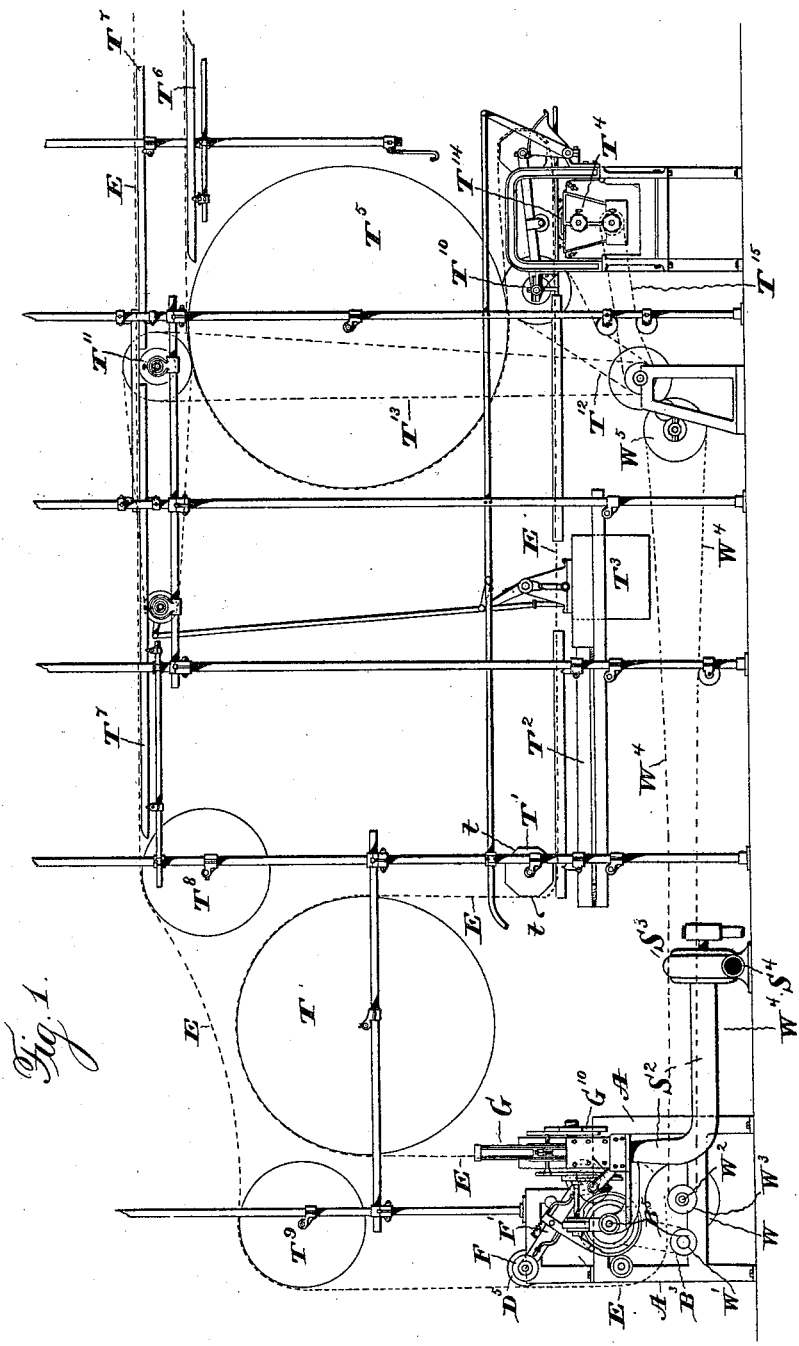
Figure 16:
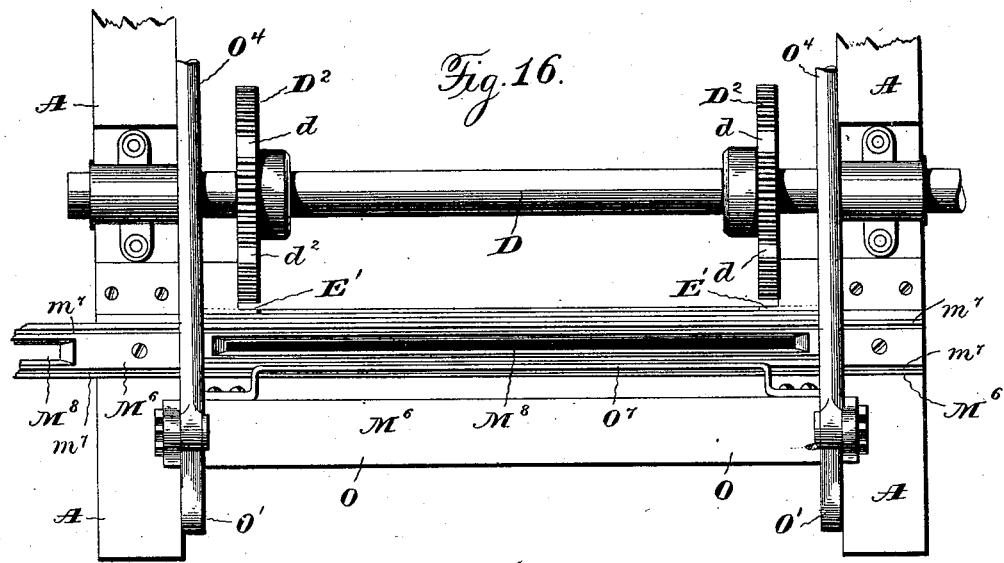
Figure 17:
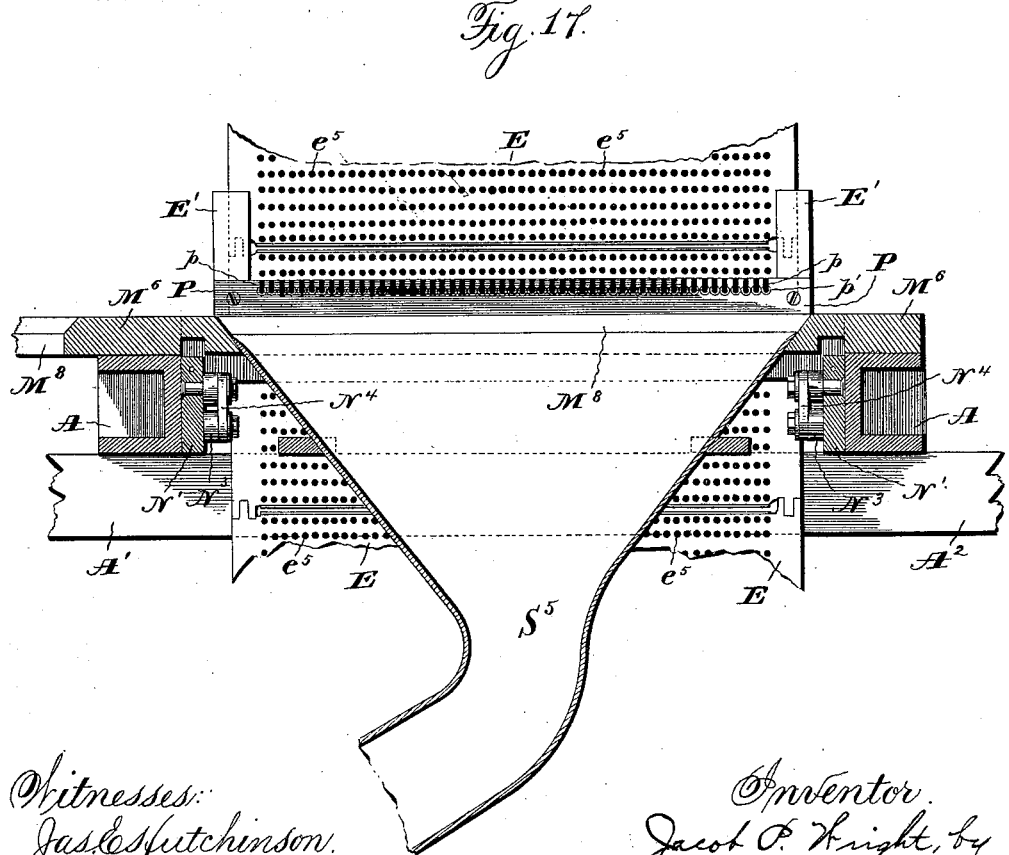
Figure 18:
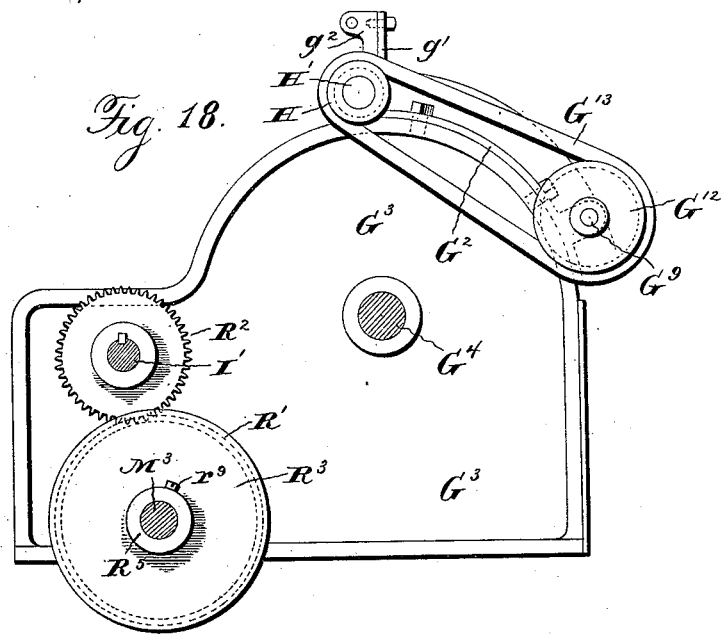
Figure 19:
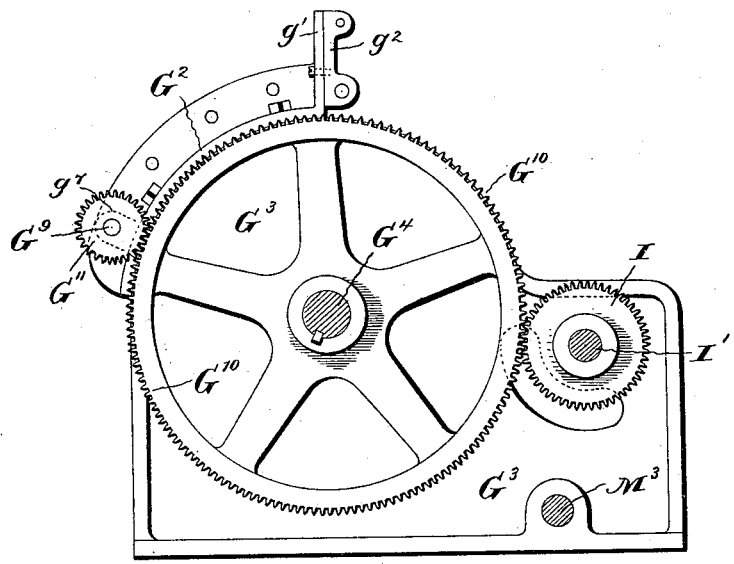
Figure 21:
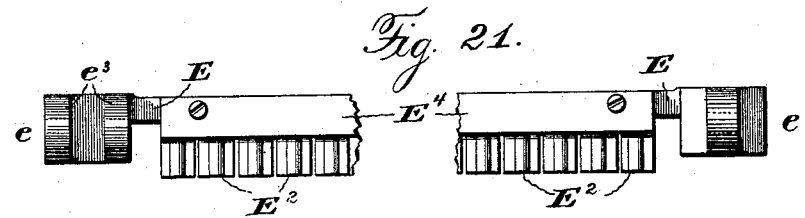
Figure 20:
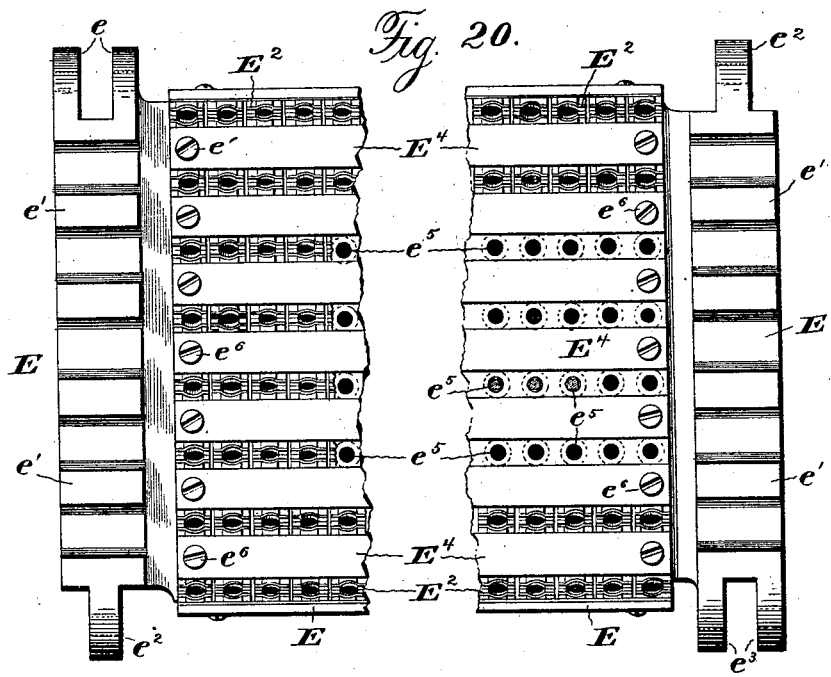
Figures 22, 23:
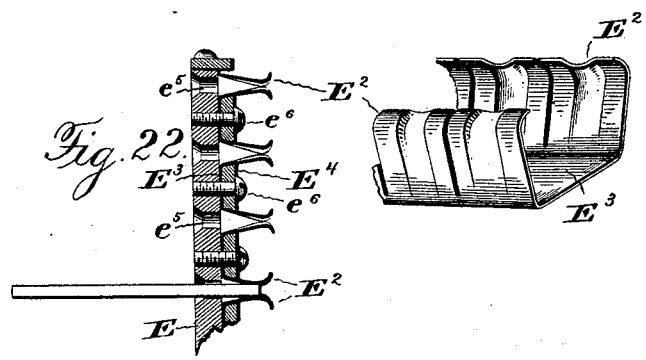

Figure 1 shows a diagrammatic view of my machine, showing a portion of the wheels or pulleys for supporting the carrier-chain during the drying and cooling of the match-heads; Fig. 2, a plan view of the main part of the machine which has to do with feeding and sticking the splints into the carrier-chain and discharging the completed matches from the latter, such carrier-chain being omitted from the drawings except where it passes the splint-sticking devices; Fig. 3, a view in rear elevation of the same part of the machine with the carrier-chain removed; Fig. 4, a similar view on an enlarged scale with the hopper and means for taking the splints from the latter left off; Fig. 5, a view in side elevation of the mechanism shown in Fig. 4, but with the transfer-chains removed; Fig. 6, a similar view, but from the opposite side, the transfer-chains and guides therefor being shown in section, the plane of section being on line $x\,x$ of Fig. 2; Fig. 7, a view of a vertical section on line $x'\,x'$ of Fig. 4 with a portion of the carrier-chain in place, shown partly in section and partly in elevation; Fig. 8, a detail view, on an enlarged scale, showing, partly in section and partly in side elevation, the carrier-chain and the mechanism for inserting the splints therein; Fig. 9, a vertical sectional view, on an enlarged scale, showing the hopper and means for taking the splints therefrom and delivering them to the transfer-chains; Fig. 10, a detail view showing in elevation a portion of the delivery side of the hopper and of the feed-drum, the scale being the same as in Fig. 9; Fig. 11, a detail view, on an enlarged scale, showing the opposite or outer side of the hopper and feed-drum, together with the mechanism for driving the same, a portion of the casing of the exhaust-trunk being broken away to show the parts of the machine; Fig. 12, a detail vertical sectional view, on a still larger scale, showing a portion of the hopper, the feed-drum, and means for taking the splints from the latter and delivering them to the transfer-chains; Fig. 13, a detail perspective view on same scale as Fig. 12, showing the means for driving and guiding the clearers at the delivery side of the hopper; Figs. 14 and 15, views in side elevation and section, respectively, of the trip mechanism for insuring the desired intermittent travel of the transfer-chains; Fig. 16, a detail view, on an enlarged scale, showing in plan the guideways for the transfer-chains and the beater-bar; Fig. 17, a view on an enlarged scale showing, partly in vertical section and partly in elevation, a portion of the exhaust-trunk, the guide-plate, and a portion of the carrier-chain; Fig. 18, a detail view showing in elevation a portion of the frame and means for driving the clearers; Fig. 19, a similar view in the opposite direction showing the gearing for actuating the shaft from which the swinging outer side or back of the hopper is driven; Fig. 20, a plan view showing one of the plates of the carrier-chain, portions of such plate being shown with the splint grasping or holding springs removed; Fig. 21, a detail view of one of the plates, showing the same in elevation, the direction of the view being toward the front side of the plate; Fig. 22, a detail view showing in section a portion of one of the carrier-chain plates; Fig. 23, a detail view showing in perspective one of the spring-plates of which the splint grasping or holding devices are made; Fig. 24, a detail view, partly in section and partly in elevation, showing the main driving or cam shaft with the cams fixed thereon; Fig. 25, a detail plan view of one of the transfer-chains; Fig. 26, a detail view showing such transfer-chain in side elevation, looking at the outer side of the same; Fig. 27, a detail plan view showing the guide for the transfer-chains; Fig. 28, a view of the same in elevation; Fig. 29, a view of a section on line $y\,y$ of Fig. 28; Fig. 30, a detail view showing in elevation a portion of the lifter-plate; Fig. 31, a similar view showing a portion of the slotted guide-plate through which the splints are passed to the carrier-plates.

The object of my invention has been to provide a machine for making matches; and to this end my invention consists in the machine and in the construction, arrangement, and combination of the parts thereof, as hereinafter specified.

While my present machine is especially designed for the making of matches from wooden or other splints previously cut and placed loosely in a hopper or splint-holding receptacle, I desire it to be understood that portions of the mechanism are applicable to and capable of being employed to advantage in match-making machines in which the splints or match-bodies are supplied in other ways.

The splints which are shown in the drawings, and upon which it has been my especial purpose to adapt my machine to work, are rectangular in cross-section; but, if desired, the mechanism shown and described in this application may, without any change involving departure from my invention, be successfully employed for operating upon and making matches from other-shaped splints or sticks, whether the same are made of wood or any other suitable material.

As will appear from the description hereinafter given and the accompanying drawings, the mechanism used in my machine for holding and conveying the splints to and past the devices for treating them, applying the heads, and cooling and drying the latter are adapted to act upon splints or match-bodies of waxed cord or taper, as well as upon those made of wood.

In Fig. 1 of the drawings, which, as described, shows a diagrammatic view of a portion of the entire machine, I have shown only a few of the wheels or pulleys for guiding and supporting the carrier-chain after it has left the point where the splints are inserted and before it reaches the point where the finished matches are discharged from it. These carrier-chain guiding and supporting wheels or pulleys are to be arranged substantially as are those in the machine shown and described in United States Patent No. 528,457, with the exception that in the present machine there is one of the large carrier-chain guiding and supporting wheels arranged so as to cause the carrier-chain to travel vertically upward past the point where the splints are inserted and then over and downward to the pulley which guides the chain to the first of the splint-treating devices.

After leaving the composition-applying mechanism the carrier-chain carrying the headed splints is to pass onward over and under a series of large guiding wheels or pulleys and then back again under a cooling-fan, as in the machine set forth in the United States patent hereinbefore referred to.

As the devices or different mechanisms for treating the splints as they are carried along by the carrier-chain can be varied without involving any departure from my present invention, and as they and the fan or cooling device can be the same in construction and operation as those shown and described in said patent, I need not describe them or their parts specifically herein.

In the drawings, A A designate the frame of the main part of the machine, to which part my present invention is applied. Such frame consists, mainly, of uprights connected by suitable cross-bars and side extensions, upon which the splint-receiving hopper and some of the operative parts, with their actuating-gearing, are supported.

Journaled in suitable bearings in frame A A is the main driving-shaft B, which is to be driven from any suitable motor or driver through any desired form of connections or gearing. As shown, it is provided with a belt-pulley $B'$, which can be engaged and driven by a belt or band $B^2$, running from any power-driven rotating band-wheel. On this driving-shaft B, close to the driving-pulley $B'$, is a gear-wheel $B^3$, meshing with and driving a gear-wheel $B^4$, fixed on shaft $B^5$, parallel to shaft B, and, like it, journaled in suitable bearings in frame A A. This second shaft has fixed upon it an eccentric $B^6$, engaging the eccentric-strap C, which is connected with the rod $C'$, the other end of which is provided with an opening engaging a pin $c$ on the rocking disk $C^2$, journaled on the shaft D and carrying a pivoted pawl $c'$. This pawl engages a ratchet-wheel $D'$, fixed on shaft D, so that as the disk is by the movement of the eccentric-rod $C'$ rocked in the direction indicated by the arrow in Fig. 5 the pawl will turn the ratchet-wheel and the shaft to which the latter is attached a certain distance, and as the disk is rocked back again the pawl will ride easily over the ratchet-teeth and leave the shaft D at rest.

Upon shaft D, close to the inner faces of the side uprights of frame A A, are the two gear-wheels $D^2 D^2$, for a purpose to be described.

A pitman-rod $C^3$, pivotally connected with the rocking disk $C^2$ by means of a pin $c^2$, has its other end pivotally connected with a second rocking disk $C^4$ by a pin $c^3$ on such disk, so that the two disks will rock together. A pivoted pawl $c^4$ on this second disk $C^4$ engages a ratchet-wheel $D^3$, fixed on the shaft $D^4$, which, carrying gear-wheels $D^5 D^5$, like the wheels $D^2 D^2$ on shaft D, is also journaled in bearings on the frame.

The operation of the pawl $c^4$ upon the ratchet-wheel $D^3$ as the disk $C^4$ is rocked is the same as that of pawl $c'$ upon the ratchet-wheel $D'$, just above described, the object of the arrangement and connections of the parts being to insure a simultaneous and equal step-by-step rotation of the two shafts $D D^4$, and consequently of their gear-wheels $D^2 D^2$ and $D^5 D^5$, as the eccentric-rod $C'$ is actuated by the eccentric $B^6$ on shaft $B^5$.

The two shafts $D D^4$ and the two pairs of gear-wheels will be caused to move with a step-by-step forward rotation as the shaft B revolves, there being one of such movements of the shafts D D⁴ and gear-wheels for each revolution of shaft B. These gear-wheels on the two shafts are the same in construction as the gear-wheels used in the machine shown and described in the United States Patent No. 528,457, hereinbefore referred to, and are for the same purpose—that is, to move the carrier-chain with a uniform step-by-step movement past the splint-sticking and match-discharging devices.

The carrier-chain E in the machine shown and described in this application is, like that of the machine set forth in the patent cited, composed of a series of plates hinged together at $e$ $e$, so as to make a continuous chain and each having on its back or inner face two series of teeth $e'$ $e'$ to mesh with the gear-wheels $D^2$ $D^2$ and $D^5$ $D^5$ on the shafts D and D⁴. These gear-wheels have some of their teeth omitted to leave double-width spaces $d$ $d$ for the accommodation of what are, in effect, double-width teeth at the points where the plates are hinged together, as best shown in Figs. 7 and 8. The teeth on the plates are so cut that the spaces between those nearest the ends of the adjoining plates would come at the points where the pivoted connections of the plates are located, and consequently would not be available for the proper reception of teeth on the respective carrier-chain-moving wheels. Such wheels are therefore not provided with teeth at the points on them which come opposite the pivotal or hinge joints of the plates, but with the wide spaces described and shown.

The form of pivotal or hinge connection between the carrier-chain plates which is shown in the drawings consists of overlapping ears on the plate ends, connected by pivot-pins passing through them. A perforated ear $e^2$ on one plate extends in between two corresponding perforated ears $e^3$ $e^3$ on the next plate, and a pin $e^4$ is passed through the three ears. While I prefer this construction, I do not, of course, limit myself thereto, as the plates may be hinged together in any other desired way.

The carrier-chain, made up of the plates hinged together and provided with the teeth for engaging the chain-moving wheels $D^2$ $D^2$ $D^5$ $D^5$, is, as it passes through the main part of the machine being described, engaged by guides at the points where the moving-wheels engage the plate-teeth. Such guides have the portions E' E' overlapping a portion of the outer sides of the carrier-plates, so as to hold the latter with their teeth well in mesh with the wheels $D^2$ $D^2$ $D^5$ $D^5$ and to cause the plates to travel straight in vertical lines as they go by the wheels. With this construction and arrangement of wheels and guides the carrier-chain plates will be brought into and held in the same position as they successively reach a pair of the chain-moving wheels.

The course of the carrier-chain E, as it passes through the main part of the machine being described, is down past the pair of moving-wheels $D^5$ $D^5$, around below the shaft B⁵, and then upward between the wheels $D^2$ $D^2$ and the vertical guides E' E', opposite such wheels. Its travel beyond these guides, and before it reaches again the wheels $D^5$ $D^5$ and the guides opposite them, will be described hereinafter.

Each of the plates of the carrier-chain is, as shown in Figs. 7, 8, 17, 20, and 22, provided with transverse rows of splint-receiving perforations $e^5$ $e^5$, of which there are preferably, though not necessarily, fifty-one in each row. These rows of perforations are arranged at such a distance apart that the lines of the centers of the perforations of two adjacent rows will be distant from each other by an amount just equal to the length of each step-by-step movement of the chain as the latter is moved by the intermittently-rotating wheels $D^2$ $D^2$ $D^5$ $D^5$, driven by the pawl-and-ratchet mechanism hereinbefore set forth. The object of this construction is to insure that as the chain is moved the rows of perforations in the plates will be successively brought up exactly opposite a certain point, where they will be kept by the moving-wheels while the latter are at rest.

The splint-receiving perforations in the plates may, if desired, be made slightly smaller in diameter than the splints, so as to compress and clasp the ends of the splints firmly as the splints are thrust into them, and the splint supplying and setting or sticking devices shown in the drawings and described hereinafter could be successfully and advantageously, in connection with the carrier-chain having the splint-receiving perforations, so made; but I prefer in the present machine, and especially where, as in the present case, the mechanism is especially intended to act upon sticks square or rectangular in cross-section, to have the perforations in the plates made large enough to inclose and engage the splints without compressing the ends or any other portions of the splints.

The grasping of the splints, so as to keep them from dropping out of the perforations, is done by spring clamping devices which engage the splint ends beyond the backs of the carrier-plates, and the perforations in the plates serve merely to steady and hold the splints from swinging sidewise in any direction as the carrier-chain moves along and the splints are brought to and past the various treating devices.

Whatever the shape of the splints may be in cross-section, the openings or perforations $e^5$ $e^5$ should be made to closely surround the splints, so that the internal faces of such openings will stand close to although not necessarily fitting the splints.

By the words "closely surround," as applied to the splint steadying or supporting openings, I do not mean necessarily to fit the splints as in the case of square or angular splints. The perforations can closely surround the same within the meaning of such words as used by me in referring to the openings $e^5$ $e^5$ in the specification and claims of this application if the openings are of such size as to stand close to the angles or corners of such splints. With this construction the splints in any carrier-plate will be held most firmly and rigidly parallel to each other from the time when they are inserted through the plate-perforations into the grasp of the spring clamping devices until they are ejected from the plate by the discharger to be described.

The spring splint and clamping devices I prefer to make of the construction shown best in Figs. 8, 20, 21, 22, and 23. These consist of a series of spring-fingers $E^2$, there being a pair of these for each perforation $e^5$ in the plate. While these fingers could be made in the form of entirely separate pieces, secured in position in any desired manner upon the back of the plate, I prefer to make them as shown, so that each row of them will consist of portions of a single plate $E^3$, which is slit or cut to make such portions movable independent of each other. Each of these plates, except the end ones, in each carrier-plate is U-shaped in cross-section, being secured to the back of the plate between two rows of perforations $e^5$ $e^5$ by a narrow plate $E^4$, engaging the plate between its upright portions and itself secured to the carrier-plate by screws $e^6$ $e^6$. With this construction, both of the upright portions of the U-shaped plate being cut or slit to form a series of the spring splint-clamping fingers, each plate carries two series of fingers situated so as to engage one side of a row of splint ends projecting through one row of plate-perforations $e^5$ $e^5$ and the other side of the next row of splint ends. The opposing fingers of each pair for grasping the opposite sides of any splint are bent inward so as to approach each other, as shown, the angle of inclination being such as to allow a splint end to be passed outward from one of the plate-perforations $e^5$ between the fingers.

To enable the fingers to secure the best and firmest hold upon the splint ends to be engaged by them, each one is made with an upwardly-extending groove on its inner side, such groove being preferably made by bending or striking outward a portion of the material of the finger. With the opposite fingers of each pair thus grooved the fingers will not only engage the opposite sides of the splint end thrust up between them, but will partially inclose a portion of it.

The end plates $E^3$ $E^3$ on each carrier-chain plate have only one series of clamping or spring fingers $E^2$ $E^2$, the sides opposite to those carrying such fingers being bent down over the ends of the carrier-plate and secured thereto by the narrow plates $E^4$ $E^4$, fastened to the carrier-plate by screws.

The splint-receiving perforations $e^5$ $e^5$ in the carrier-plates are preferably countersunk, as shown, at their ends through which the splints are to enter, so as to facilitate and insure the proper entry of the splint ends.

In order to positively lock the shafts D $D^4$, and consequently the pairs of wheels $D^2$ $D^2$ $D^5$ $D^5$, engaging the teeth on the plates of the carrier-chain when such wheels are not being turned forward by the pawl-and-ratchet step-by-step mechanism hereinbefore described, I provide the automatic intermittently-acting locking device. (Shown best in Fig. 6.)

Fixed upon the end of each shaft D $D^4$, just outside of frame A A, is a toothed wheel F. A plate F', supported at its opposite ends upon the shafts D $D^4$, respectively, which pass through openings provided for them in the plate, has pivoted to it at $f$ a lever $F^2$, which on opposite sides of its pivot is pivotally connected, by means of pins $f'$ $f'$, with the inner ends of the two oppositely-moving bolt-rods $F^3$ $F^3$, one of which extends toward the toothed wheel F on shaft D and has a nose to engage the teeth of the same, and the other of which extends toward the wheel F on shaft $D^4$ and has a nose to engage its teeth. Guides $f^2$ $f^2$ on plate F' serve to guide these bolt-rods at points near their wheel-engaging ends. The connection of the bolt-rods with the lever $F^2$ is such that as the lever is swung in one direction or the other it will cause the bolt-rod ends or noses to engage or be disengaged from the respective toothed wheels F F. A spring $F^4$ tends to swing the lever, so as to disengage the noses of the bolt-rods from such wheels, in order to leave the latter, and consequently the shafts D $D^4$, to which they are attached, free to be rotated, as the hereinbefore-described pawl-and-ratchet mechanism acts to turn such shafts to cause the carrier-chains to be fed along.

In order that the lever $F^2$ may be moved at intervals to cause the described locking mechanism to positively lock and hold locked the wheels F' F' and the shafts carrying them, the shaft $B^5$ is provided with a cam $F^5$, adapted to engage a roller $f^3$ or other bearing on the lever and swing the latter in a direction to move the bolt-rods $F^3$ $F^3$ into spaces between the teeth on the respective wheels F F, the higher part of the cam, which thus moves the lever, being so arranged with relation to the eccentric $B^6$ and of such extent that it will cause the wheels F F, and consequently the shafts D $D^4$ and the carrier-chain, to be positively locked against movement when the step-by-step ratchet mechanism for revolving such shafts is not acting to turn the same forward in the manner hereinbefore indicated. The carrier-chain will then, when it has been moved to bring a row of its plate-perforations to a certain point, be held securely against any movement in either direction to carry the said row of perforations away from said point. With this construction, when a row of perforations has been brought into proper position opposite the splint inserting or sticking mechanism to be described, the carrier-chain can be held positively, so as to keep the row of perforations in proper position until the insertion of a row of splints has been completed. This splint inserting or sticking mechanism is situated so as to insert the splints in the perforations of the carrier-plates at a point where such plates pass between the moving-wheels $D^2$ $D^2$ and the plate-guides $E'$ $E'$.

By the locking of the toothed wheel F on shaft $D^4$ the carrier-chain is held with a row of perforations in line with the pins of a match-ejecting device which is to discharge the finished matches from the carrier-plates, such device being described hereinafter.

On one of the side extensions of frame A A, referred to hereinbefore, is the hopper G for receiving and holding the splints $g$ $g$, which, as shown, are rectangular in cross-section, such hopper being of a width substantially equal to the length of the splints and so situated as to hold the splints lying in a direction at right angles to the plane of travel of the carrier-chain and in position to be taken from the hopper and carried sidewise past the outer face of the carrier-chain by the mechanism to be described, is formed of two upright rigid sides and a front $G'$, which is preferably made, as shown, sloping downward and rearward, as seen in Fig. 9. The bottoms of the sides of this hopper are secured to the upright flanges of the two curved pieces $G^2$ $G^2$, which are bolted to the curved upper edges of the two upright parallel plates $G^3$ $G^3$, supported on the side extension $A'$ of the frame A A. Each of the pieces $G^2$ $G^2$ has at its forward end an upright plate $g'$, to which is bolted a bearing-block $g^2$ to form a support for the clearer mechanism, to be hereinafter described, situated and operating in an opening in the lower part of the hopper front.

Journaled in bearings in the two plates $G^3$ $G^3$ is a shaft $G^4$, carrying the splint-feeding drum $G^5$ for taking the splints from the hopper, such drum revolving in the open lower side of the hopper and forming in effect the bottom thereof, upon which the mass of splints rest. This drum, which, as shown in the drawings, (see Figs. 2 and 11,) is made somewhat narrower than the width of the space between the hopper sides for a purpose to be described hereinafter, has its two ends provided with a series of large openings $g^3$ $g^3$ and its periphery formed of two separate series of parallel longitudinal ribs $g^4$ $g^4$, having their opposite ends connected with the drum ends. The ribs in each series are separated from each other by a space just sufficient to allow a match-splint from the hopper to drop down easily between them, and the height of the ribs is equal to the thickness of one of the splints. The bottoms or inner sides of the spaces between ribs $g^4$ $g^4$ are left open, communicating with the space within the drum. The two series of ribs are separated from each other by broad blank spaces, (see Figs. 9 and 12,) and where these spaces are the ends of the drum have their edges provided with the raised portions $g^5$ $g^5$, extending circumferentially along them from a point near the end of one series of ribs $g^4$ $g^4$ nearly to the adjacent end of the other rib series. The height of these portions $g^5$ $g^5$ is such that their upper or outer sides travel in the same plane with the outer faces or sides of the ribs $g^4$ $g^4$ as the drum rotates. The spaces between the ends of the raised portions $g^5$ $g^5$ and the ends of the two series of ribs $g^4$ $g^4$ are of the same size as the spaces separating ribs $g^4$ $g^4$ and are adapted to receive portions of splints descending from the hopper into them. The number of ribs $g^4$ $g^4$ in each series should be such as to make the number of spaces between such ribs, plus the two spaces between the ends of the series of ribs and the ends of raised portions $g^5$ $g^5$, equal to the number of perforations in each row on the plates of the carrier-chain.

In the drawings there are in each series fifty ribs, so that the number of match-splint-receiving spaces on the drum will be fifty-one in each series.

The feed-drum constructed as above described is in effect a hollow pocketed drum having two series of splint-receiving pockets, with their bottoms, except near their ends, open and communicating with the drum's interior.

With the hopper supplied with splints $g$ $g$ and the feed-drum revolving in the direction indicated by the arrow in Fig. 9 the splints will tend to drop into the drum-pockets or the spaces between the ribs $g^4$ $g^4$ and between the end ribs of the series and the ends of the raised portions $g^5$ $g^5$, so that they will be supported near their ends by the portions of the ends of the drum forming the bottoms of such pockets or spaces. The rotation of the drum will then carry the splints so seated in the pockets or spaces along under the remaining mass of splints and out beyond the front of the hopper. When by the rotation of the drum the raised portions or circumferentially-extending ribs $g^5$ $g^5$ are brought under the splints in the hopper, they will, by engaging portions of the splints near the ends thereof, keep the splints up, so that the longitudinal ribs $g^4$ $g^4$ can pass freely under them.

To facilitate the seating of the splints, I hinge the back $G^6$ of the hopper to the hopper sides at $g^6$ and provide means for constantly swinging such back in and out toward and from the front of the hopper, such means, as shown, consisting of a pitman-rod $G^7$, pivotally connected at one end with the swinging back and at the other engaging a crank $G^8$, driven by the shaft $G^9$, journaled in bearings $g^7$ $g^7$ on the hopper-supporting pieces $G^2$ $G^2$. This shaft is driven by a gear-wheel $G^{10}$, fixed on the drum-shaft $G^4$, meshing with the pinion $G^{11}$ on shaft $G^9$. (See Figs. 3, 11, and 19.)

The swinging movement of the hopper back caused by the described mechanism serves to jar the splints in the hopper, so as to straighten them out into a position parallel with each other and with the feed-drum pockets and to shake them down toward and into such pockets. It effectually prevents the "bridging" of the mass of splints in the bottom of the hopper which would be caused by the compacting together of the splints, since each backward or outward movement of the hinged back will take away the support of any bridge which tends to form and will leave the splints loose, so that they can descend easily toward the feed-drum to enter the drum-pockets as the latter are brought around to them by the movement of the drum.

To prevent any splints from getting rearward beneath the hopper back between its lower edge and the periphery of the feed-drum, the hopper back $G^6$ is provided with downwardly-projecting lips $g^8$ $g^8$, situated on each side of the feed-drum.

On the opposite end of crank-shaft $G^9$ from the pinion $G^{11}$ is fixed the belt-wheel $G^{12}$, driving the belt $G^{13}$, which engages and drives the smaller belt-pulley H, fixed on the shaft H', journaled in bearings on the bearing-blocks $g^2$ $g^2$, hereinbefore described. This shaft, extending across in front of the opening in the lower part of the hopper front, carries eccentrics $h$ $h$ $h$ $h$, eight in number, arranged in two series of four each on opposite sides of a vertical plane running midway between the hopper sides. Of these eccentrics the two outer ones of the two series are similarly arranged on the shaft, so that their portions of greatest radius will be on the same side of the shaft. The next inner eccentrics of the two series are arranged with their portions of greatest radius on the same side of the shaft, but out of line with the highest portions of the outer eccentrics. The same arrangement is carried out with the two next inner eccentrics of the two series, their parts of greatest eccentricity being on one side of the shaft, but out of line with the corresponding portions of the pairs of eccentrics just above described. The two innermost eccentrics, being similarly arranged on the shaft, have their highest points out of line with those of the other eccentrics. The parts of adjacent eccentrics which are of the greatest radius or eccentricity are arranged on radial lines running out from the shaft-axis in planes at right angles to each other, so that with relation to the rotation of the shaft the portions of adjacent eccentrics which are of the greatest radius are distant from each other a quarter of a revolution. The two sets or series of eccentrics are arranged at some distance from opposite sides of the plane running midway between and parallel to the hopper sides. Each eccentric engages an opening $h'$ in a plate $H^2$, which has near its upper end a longitudinal slot $h^2$, which engages a rod $H^3$, supported at its opposite ends in the bearing-blocks $g^2$ $g^2$.

With this construction the plate $H^2$ is left free to rise and fall and swing in and out with reference to the hopper as the shaft H' revolves and causes the respective eccentric to actuate the plate.

Shaft H' is revolved in such direction as to cause the eccentrics on it to move the respective plates $H^2$ $H^2$ downward and inward into the hopper-opening and then upward and outward again. The inner faces of these plates are preferably made straight and plain, as shown, and of such length as to travel close to the periphery of the feed-drum or the outer faces of the ribs of the latter when the plates are at the lowest limit of their travel and are being moved inward toward the interior of the hopper. The driving-gearing of the shaft is arranged so as to drive the latter quite rapidly. The result is that the plates $H^2$ $H^2$ act as rapidly-moving clearers which with an inward and upward movement kick back any splints which have not become seated in the pockets or splint-receiving spaces of the feed-drum. As these kicking clearer-plates, engaging the splints in the hopper in pairs, of which the two of each pair are situated at equal distances from and on opposite sides of the middle of the engaged splint or splints, move quickly inward and upward they will most easily and efficiently clear back any splints not properly taken by or seated in the pockets of the drum, so as to surely prevent all clogging of the splints at the point where the periphery of the drum leaves the hopper. They will also, by their action upon the splints engaged by them and because of the jarring which is given splints adjacent to those directly engaged, operate to cause the straightening of any splints which may be in a crooked position in the hopper.

The engagement of both the swinging back of the hopper and the kicking clearers described with the splints and the jarring of the mass of splints in the hopper by the operation of the two mechanisms described will, I have found, cause the splints in the hopper to get and remain in the desired position parallel to each other and to the drum-pockets or splint-receiving spaces, so that they can most readily enter the latter.

To prevent any splints from engaging or being engaged by the upper portions of plates $H^2$ $H^2$, I provide within the forward side of the hopper a guard-plate $H^4$, which, extending downward and rearward just behind the hopper front, has its lower portion bent outward and provided with tongues $h^3$ $h^3$ $h^3$, extending downward and outward between the two series of clearer-plates and beyond the ends of such series.

The shaft $G^4$ of the feed-drum is driven by the pinion I, meshing with the gear-wheel $G^{10}$, such pinion being fixed on the shaft I', journaled in bearings in the upright frame-plates $G^3$ $G^3$ and having its end opposite to that carrying the pinion I journaled in a bearing $I^2$ on a bracket-arm $A^2$, extending out from the side extension A' of the machine-frame A A. This bearing is a double one, consisting of two parallel parts, between which is the worm-wheel $I^3$, fixed upon the shaft and meshing with the driving worm-wheel $I^4$, secured to a shaft $I^5$ at right angles to shaft I' and journaled in bearings supported by the bracket-arm $A^2$ below the shaft I'. The shaft I⁵ is situated directly in line with the shaft B⁵, hereinbefore described, and besides carrying the worm-wheel I⁴ has fixed upon it a gear-wheel I⁶ and a clutch-sleeve I⁷, adapted to be engaged by a sliding clutch-sleeve I⁸ on the adjacent end of shaft B⁵.

The construction of the two coacting clutch-sleeves can be that well known in clutch devices and need not be described specifically herein.

The sliding sleeve I⁸, having teeth or projections to engage corresponding parts on the fixed sleeve I⁷ on shaft I⁵, is connected with shaft B⁵ by the usual spline or feather I⁹, engaging a groove in the sleeve, and has the usual circumferential groove I¹⁰ to be engaged by a pin I¹¹ on each arm of the fork of the clutch-shifting lever I¹². With this construction as the lever is moved to carry the clutch-sleeve I⁸ into or out of engagement with the clutch half or sleeve I⁷ on shaft I⁴ the latter shaft and the worm-wheel I⁴ and gear-wheel I⁶ will be driven from the shaft B⁵ or disconnected therefrom and allowed to remain at rest, while the shaft B⁵ continues to revolve to actuate the carrier-chain-moving devices and the splint setting and discharging devices.

Fixed upon shaft I' is a transfer-drum, consisting of the body K and the two disks K' K' of greater diameter than the body secured to its ends. These disks have in their peripheries the notches $k\ k$ to receive and hold portions of match-splints, the notches in the two disks being arranged so that those in one disk are directly opposite those in the other, so that a splint resting in notches in the two disks will be parallel to the axis of the drum.

The relative arrangement of the described gearing connecting shaft I' with the feed-drum shaft G⁴ and the notches or pockets $k\ k$ of the transfer-drum is such that as the two drums revolve in opposite directions, as indicated by the arrows in Fig. 9, the notches or pockets of the transfer-drum will come exactly opposite the splint-holding pockets or spaces on the feed-drum. With this construction any splints contained in the pockets or spaces of the feed-drum may, when they come around opposite the notches of the transfer-drum, be pushed out into the notches of the latter. To thus transfer the splints from the feed to the transfer drum, I provide the two bent guide-plates K² K², which, being fastened to a fixed portion of the casing to be described, extend down close to the ends of the feed-drum and are bent outward to cross at an angle the paths of the splint ends projecting beyond the sides or ends of the feed-drum. The point where these guide-plates thus cross the paths of the splints is such that the splints will by their engagement with the inclined faces of the plates be moved out of the pockets of the feed-drum into the opposing notches of the transfer-drum, as indicated in Figs. 9 and 12. From this point the plates K² K² are curved downward and outward or forward on a curve concentric with the notched disks of the transfer-drum, so as to engage the ends of the transferred splints in in such way that such splints will be retained in the transfer-drum notches until they reach the under side of the latter drum. Here the ends of the guide-plates K² K² are bent downward, so as to leave the splints free to descend out of notches $k\ k$ into the notches or pockets of two parallel transfer-chains M M, traveling outward from below the transfer-drum.

Other splint-guiding plates K³ K³ are arranged above the pocketed transfer-chains M M, having their ends, situated on opposite sides of the transfer-drum, bent up, so as to cross the path of the ends of the splints in the pockets or notches of the transfer-drum at such an angle and at such a point as to insure the downward passage of the splints from the transfer-drum to the pockets of the transfer-chains, as indicated in Figs. 9 and 12 of the drawings. From their turned-up ends these plates K³ K³ extend along parallel to the chains, so as to effectually prevent the splints from getting out of the pockets or notches of the latter until the space directly in front of the carrier-chain E is reached.

The chains M M are formed of a series of links pivoted together, each having in its outer edge two notches $m\ m$, and at each end a half-notch, the arrangement being such that as the links are hinged together by the hinge-pins $m'\ m'$ the half-notches on adjoining link ends will form, when the chain is moving along in a straight line, a notch like the others, $m$, adapted to receive and hold a match-stick at one point. Toothed guide-links $m^2\ m^2$, of which there is one for every other link $m$, are secured in place on the chain by the hinge-pins $m'\ m'$, as shown best in Fig. 25, and have on their inner edges the teeth $m^3$, one for each link $m^2$.

The under or inner edges of all of the links are preferably curved, as shown, so as to engage and be supported by the two rollers M' M², around which the chains travel. Each of these rollers has in its periphery the two parallel circumferential grooves $m^4\ m^4$ to receive portions of the chains, so as to hold the latter securely at the desired distance apart, and the longitudinal deeper grooves $m^5\ m^5$ to receive and engage the teeth $m^3\ m^3$, so as to move the transfer-chains along as the rollers are rotated. The grooves $m^5\ m^5$ on each roller are so situated that the two parallel chains will always have their notches exactly opposite each other as the chains travel along, and the driving mechanism which is applied to the roller M' is so timed with reference to that rotating the transfer-drum that when the chains are being moved their notches $m\ m$ will come opposite the notches $k\ k$ of the transfer-drum in position to receive the splints from the latter, as indicated in Figs. 9 and 12. Of these two transfer-chain-supporting rollers $M'$ $M^2$ the former is secured to a shaft $M^3$, journaled in the upright plates $G^3$ $G^3$ on the side extension $A'$ of frame A A, while the other roller has its shaft $M^4$ journaled in bearings $m^6$ $m^6$ on plates $M^5$ $M^5$, adjustably supported on the side extension $A^2$ on the other side of the frame A A in such position that the transfer-chains move in front of and parallel to the carrier-chain E where the latter passes upward toward and by the guides $E'$ $E'$ and the carrier-chain-actuating wheels $D^2 D^2$. The portion of the inner transfer-chain which is traveling from roller $M'$ to roller $M^2$ is situated quite close to the path of the carrier-chain.

The line of travel of the transfer-chains is parallel to the lines of the rows of perforations in the carrier-chain plates, and the notches $m$ $m$ are the same distance apart as are the perforations $e^5$ $e^5$ in such plates, so that the transfer-chains carrying splints supported in their notches $m$ $m$ can readily be brought into position so that each splint will be in the same vertical plane with the axis or central line of one of the plate-perforations.

To guide and support the two transfer-chains on their way from the roller $M'$ to the roller $M^2$, I provide the guide-bar $M^6$, extending from a point below the transfer-drum transversely across the path of the carrier-chain E to a point just beyond such path, the bar being supported on the frame A A. This bar has on opposite sides the longitudinally-extending rabbets $m^7$ $m^7$ to accommodate the notched links of the two chains, the shoulders at the bottoms of such rabbets forming supports over which the under sides of such links travel, and the deeper rabbets $m^8$ $m^8$ to accommodate the teeth $m^3$ $m^3$ on the chain-links $m^2$ $m^2$. Plates $M^7$ $M^7$, fastened to the inner and outer sides of bar $M^6$, engage the sides of these links $m^2$ $m^2$ and have overhanging flanges $m^9$ $m^9$ to engage the upper faces of such links, so as to hold the chains securely down in place with the notched links bearing upon the bottoms of the guiding and supporting rabbets and the notches of the links above the upper faces of the bar $M^6$ and the plates $M^7$ $M^7$.

The bar $M^6$ has two longitudinal slots or openings $M^8$ $M^8$ made through it between the ways for the transfer-chains, one of such openings beginning near the end of the bar which is below the transfer-drum and ending where the bar reaches the part of frame A A, upon which it is supported, and the other extending along the part of the plate which is in front of the carrier-chain way between the two bar-supporting parts of frame A A. These openings or slots have their sides beveled or inclined downward and inward from their upper edges, which in the case of both sides of the opening which is situated in the part of the bar beyond the frame A A and the inner side of the other opening are situated very close to the transfer-chain guideways, (see Figs. 27 and 29,) so that any pieces of splints which are too short to extend across into opposite notches of the transfer-chains or any splints becoming unseated from the notches of either chain can descend easily through the openings without danger of lodging on the bar, so as to interfere with the other splints in the pockets or notches of the chain.

Between the outer side of the opening or slot $M^8$, which extends across in front of the carrier-chain and the guideway for the outer transfer-chain, is a narrow slot $M^9$, extending through the bar $M^6$, in which is situated one of the rising-and-falling plates N N of the splint-lifter, the other plate being situated on the inner side of the bar $M^6$. These two plates, having their ends secured to the vertically-moving heads $N'$ $N'$, guided between the pairs of guides $N^2$ $N^2$, secured to frame A A, have their upper edges provided with a series of notches $n$ $n$, as shown best in Fig. 30, of a number equal to that of the perforations in any row in the plates of the carrier-chain and having their bottoms adapted to receive and hold portions of the splints at the same distance apart as such perforations.

The two plates N N have their notches $n$ $n$ correspondingly arranged opposite each other, so that a match-splint engaged by opposite notches will be held at right angles to the face of the carrier-plate with its inner end directly opposite the line of travel of one of the perforations in each row on the carrier-chain plates as such chain is moved along.

The notches $n$ $n$ are preferably not made rectangular in shape, but have their sides inclined upward and outward, as shown, so as to leave between the upper ends of the notches only a narrow part or point, the object of such construction being to facilitate the receiving and seating of splints in the notches.

The plates N N of the lifter, notched as described, are intended to be raised to lift the splints out of the pockets or notches in the transfer-chains when the latter have been brought to rest in front of the carrier-chain way.

The movement of the transfer-chains during the operation of the machine is an intermittent one, caused by mechanism to be described. Each forward movement of the chains is equal to the space taken up by fifty-one notches on each chain, such number being that of the perforations in any row on one of the carrier-chain plates. The travel of the notched chains, constituting the transfer-carrier for the splints, is then such that it brings successive series of fifty-one splint-holding notches successively into position in front of the carrier-chain E.

To raise the lifter to cause it to take the splints from the transfer-carrier in its notches $n$ $n$, I provide the two levers $N^3$ $N^3$, pivotally supported on frame A A, each having one end connected with one of the sliding heads $N'$ $N'$ by a link $N^4$ and its other end engaged by one of the cams $N^5$ $N^5$ on the cam-shaft $B^5$, each of such cams having its raised portion adapted to move the respective lever $N^3$ far enough to raise the lifter sufficiently to bring the bottoms of its notches entirely above the chains of the transfer-carrier and hold it in such raised position for a short time.

Springs $N^6$ $N^6$, attached to the frame A A and heads $N'$ $N'$, serve to draw the lifter quickly downward when the cams $N^5$ $N^5$ have released the levers $N^3$ $N^3$.

The upward movement of the lifter is such that it will bring any splints resting in the notches $n\ n$ of its plates exactly opposite a row of perforations in one of the carrier-chain plates each time that such carrier-chain comes to rest and while it is held locked by the mechanism hereinbefore described.

To thrust the splints on the raised lifter into the carrier-plate perforations opposite them, I provide the beater-bar O, supported on the swinging arms $O'$ $O'$, pivoted at $o\ o$ to the frame A A, such bar being adapted, as it is moved inward toward the lifter and the carrier-chain, to engage the outer ends of the splints projecting from the lifter and drive the splints endwise into and through the perforations $e^5$ $e^5$ of the carrier-chain plate, so that the inner ends of the splints will pass between and be grasped by the spring-fingers $E^2$ $E^2$ on the back or inner side of the carrier-plate.

The splint-setting movement of the beater-bar O is a quick one, caused by the action of the cam projections $o'\ o'$ of the two cam-wheels $O^2 O^2$, fixed on the shaft $B^5$ upon the bearings $o^2\ o^2$ on two levers $O^3\ O^3$, pivoted to the opposite sides of frame A A at $o^3$. These levers are connected with the beater-bar by links $O^4$ $O^4$. Springs $O^5$ $O^5$, attached to the frame A A and to levers $O^3$ $O^3$, serve to throw the latter quickly forward to return the beater-bar to its normal retracted position when the projections $o'\ o'$ of the cam-wheels $O^2$ $O^2$ have passed the bearings on the levers.

In order that the position of the beater-bar when at the limit of its inward throw may be adjusted as desired, each of the links $O^4$ $O^4$ is made in two parts, having their adjacent ends oppositely threaded and engaged by the correspondingly-threaded opposite ends of a connecting-sleeve $O^6$. By turning this sleeve in one direction or the other the two parts of the link can be brought nearer together or farther apart to shorten or lengthen the link, according as it is desired that the beater-bar shall be nearer to or farther from the carrier-chain when at the limit of its inward splint-setting movement. The beater-bar can thus be adjusted to thrust the splints to the desired extent through the perforations $e^5$ $e^5$ of the plates of the carrier-chain.

In order to securely hold the splints down in place in the notches $n\ n$ of the lifter, both when the latter comes to rest at the end of its quick upward movement and while the beater-bar is driving them inward into the carrier-plate perforations, the beater-bar O is provided with the guard-frame $O^7$, projecting inward from its inner face and over the lifter. This frame, as shown, consists of a bent bar having its main portion adapted to extend over and close to the upper sides of any splints held in the lifter-notches when the lifter is raised and the bent end parts attached to the beater-bar.

To insure the proper entrance of the inner ends of the splints into the perforations of the carrier-plate as the splints supported by the raised lifter are driven inward by the beater-bar, the guide-plate P is provided, secured to the uprights which carry the guides $E'$ $E'$ for the carrier-chain. This guide-plate has the series of slots $p\ p$ with open upper ends, their lower ends being so situated as to be in line with the lower sides of the carrier-plate perforations, into which the splints are to be thrust. Around such lower ends of the slots are the countersinks $p'\ p'$, adapted to insure the guidance of the ends of the splints through the slots to the perforations which are to receive them beyond plate P should any of such splint ends tend to get a little out of line with the receiving-perforations of the carrier-chain plate before or as the splints are being driven in by the beater-bar.

The mechanism for giving the transfer-carrier (consisting of the notched or pocketed transfer-chains M M and the driving and supporting rollers) the desired intermittent forward movement to bring each time a new series of fifty-one splint-holding notches into position opposite the carrier-chain is constructed as follows: On the shaft $M^3$ of roller $M'$, which is the one which drives the transfer-chains M M, is fixed the ratchet-wheel R, having a hub $r$, upon which is journaled the gear-wheel $R'$, meshing with and driven by a pinion $R^2$, fixed upon the shaft $I'$ of the transfer-drum, which latter shaft carries fixed upon it the pinion I, hereinbefore described as meshing with and driving the gear-wheel $G^{10}$ on the shaft of the feed-drum $G^5$. The shaft $I'$ and consequently the feed-drum and transfer-drum rotate continuously while the machine is in operation, and the sliding clutch-sleeve $I^8$ is held in engagement with the fixed clutch hub or sleeve $I^7$. The gear-wheel $R'$ has journaled in it the short rock-shaft or pin $r'$, which has fixed upon one end the pawl $r^2$ to engage the ratchet-wheel R, and on its other end the rigid trip-arm $r^3$ to be engaged by a trip-lug $r^4$ on the inner side of the flange $r^5$ of the trip-disk $R^3$. A spring $r^6$, attached to gear-wheel $R'$, acts to press the pawl $r^2$ toward the ratchet-wheel. The disk $R^3$ is secured by screws $r^7\ r^7$ (see Figs. 14 and 15) to the hub $r^8$ of the worm-wheel $R^4$, journaled loosely on shaft $M^3$, and kept in place thereon by the collar $R^5$, fixed to the shaft by set-screw $r^9$. A washer or collar $r^{10}$ is placed on the shaft $M^3$, between the inner side of the trip-disk $R^3$ and the pawl-carrying gear-wheel $R'$. The worm-wheel $R^4$ meshes with and is driven by the worm $R^6$, carried by shaft $R^7$, journaled in bracket-arms $r^{11}$ $r^{11}$ on the side extension $A'$ of the frame $A$ $A$. A pinion $R^8$, fixed upon this shaft, meshes with and is driven by the gear-wheel $I^6$, rotating with shaft $I^5$. This pinion has one-half the number of teeth that the gear-wheel has, and the worm-wheel $R^4$ has forty teeth.

The relative arrangement of the described intermeshing gears, worm $R^6$, and worm-wheel $R^4$ is such that for each revolution of the roller $M'$ and the gear-wheel $R'$ the trip-disk $R^3$ is turned forward to carry its pawl-tripping lug $r^4$ in the direction of the travel of the pawl, so that the gear-wheel $R'$ and consequently the shaft $M^3$ and roller $M'$, because of the engagement of pawl $r^2$ with ratchet-wheel $R$, will have to travel through one and one-twentieth of a revolution before the pawl will, because of the engagement of the trip-arm $r^3$ with the lug $r^4$, be moved to entirely disengage the pawl from the ratchet-wheel and let the shaft $M^3$ and roller $M'$ come to a rest. The described one and one-twentieth of a revolution of roller $M'$, I have found necessary to insure the travel of the transfer-chains through the full distance of fifty-one of the transfer-chain notches.

While with the parts of the transfer-chain-moving mechanism arranged as shown in the drawings I prefer the trip devices set forth above, I wish it to be understood that I do not limit myself to the specified construction of such device, but can use instead without departure from my invention any other desired form of means for insuring the required intermittent movement of the transfer-chains.

Each stoppage of the roller $M'$ occurs just as the feed of the splints from the feed-drum under the transfer-drum to the transfer-chains is stopped, because of one of the unpocketed portions of the feed-drum passing the transfer-drum.

The cams for actuating the lifter to raise the splints from the transfer-chains and the beater-bar to drive the splints on the lifter into the perforations of the carrier-chain are timed so as to act upon the respective levers $N^3$ $N^3$ and $O^3$ $O^3$ while the transfer-chains are at rest and before the roller $M'$ begins to rotate forward again.

While with the hereinbefore-described devices for jarring and straightening the splints in the hopper and for clearing back the splints not seated in the feed-drum pockets the feeding of the splints from the hopper will be carried on as the feed-drum revolves, I have found it of great advantage to provide means for insuring the seating of the splints in the feed-drum pockets or notches and for removing any chips or broken splints from the hopper, so that they may not interfere with such seating of the splints. With this end in view the distance between the plates $G^3$ $G^3$ is made greater than the width of the feed-drum, so that there will be spaces left on each side of the latter.

Curved plates $S$ $S$ on the plates $G^3$ $G^3$ extend inward close to the sides of the feed-drum, so as to close the upper and forward portions of the said spaces. The curvature of these plates is substantially concentric with the feed-drum, and their inner edges are in contact with continuous portions of the feed-drum ends or sides, so as to prevent the downward passage of air into the spaces between the drum and the plates $G^3$ $G^3$.

The plates $S$ $S$ form with the plates $G^3$ $G^3$ a casing inclosing the spaces at the sides of the feed-drum, to which casing the splint guide-plates $K^2$ $K^2$, hereinbefore described, are fastened. Connected with and forming an extension of this casing is a chamber $S'$, extending down below the feed-drum, the sides of the chamber beyond the feed-drum being extended across such drum, close to the periphery thereof, the construction being such that with an exhaust fan or pump connected with this chamber $S'$ air will be drawn down through the openings in the periphery of the upper part of the drum and will pass from the drum interior to the chamber $S'$, through the openings $g^3$ $g^3$ in the drum ends as well as through the openings of that part of the drum-periphery which happens to be passing through the chamber $S'$ or the space within the drum-inclosing casing. With this chamber is connected the exhaust or suction trunk $S^2$, running to an exhaust pump or fan, (indicated at $S^3$,) which has the discharge-trunk $S^4$, which is to lead to any point where it is desired that the dust, chips, and pieces of splints drawn down into chamber $S'$ shall be discharged—as, for instance, to the fire-box of a furnace.

Any of the well-known forms of suction or exhaust pumps or fans can be employed, and it is therefore not necessary to describe the construction of such device herein.

With the casing and exhaust-chamber arranged as above described with reference to the feed-drum and the exhaust device in operation as the feed-drum revolves to carry its periphery along under the mass of splints in the hopper any short pieces or splinters which may be present in the mass and which if they remained there would interfere with or prevent the desired seating of the splints in the drum-pockets will be drawn by the passage of the air down through the openings in the bottoms of the drum-pockets or through the large openings in the drum-periphery situated between the series of pockets and from the interior of the drum out through the openings $g^3$ $g^3$ in the drum ends, whence they will pass on down through the chamber $S'$ and the trunk $S^2$ to and through the discharge-trunk $S^4$. Any dust or small pieces or splinters which may not be thus drawn out through openings $g^3$ $g^3$ will be drawn down and out through the openings in the periphery of the under side of the drum.

Any splints which may be lying too crooked in the hopper to be straightened by the action of the swinging hopper back and the kicking clearers can pass down and out of the hopper through the larger openings in the drum's periphery. In this way broken splints, splinters, and crooked-lying splints which would otherwise tend to collect in the lower part of the hopper and keep the good splints in the mass in the hopper from getting into the drum-pockets are automatically and quickly got out of the way and disposed of by the machine. The suction causing the air to pass through the hopper and down through the open bottoms of the drum-pockets serves also to cause the splints under which such pockets may come when the drum is revolving to drop quickly into and be firmly and squarely seated in the pockets. It also acts to retain the splints so seated in the drum-pockets after such pockets have moved outward from the hopper and while they are traveling to the transfer guides, which are to shift the splints to the notches or pockets $k$ $k$ of the transfer-drum.

The action of the suction in causing the passage of the splints from the hopper in the drum-pockets has been found to be very advantageous, since the splints are naturally quite light and have very little weight to cause them to drop into the pockets because of their own gravity. The downward draft caused by the suction makes them drop quickly into any empty pockets coming below them, overcoming any friction of the adjacent splints upon their sides.

In order to hold the splints down in the pockets or notches of the transfer-chains, and also to draw off and dispose of any pieces or splinters of match-sticks, there is another suction-trunk $S^5$, connected to trunk $S^2$ and having its upper end, made hopper-shaped, communicating with that opening $M^8$ in bar $M^6$ which extends along that portion of the bar which is in front of the carrier-chain way, as described hereinbefore. With this construction any splinters, pieces of splints, or whole splints which may get out of the chain-notches and in between the transfer-chains will be drawn away through the trunk $S^5$.

Should any splints be broken during a setting operation as the beater-bar is forcing them into the perforations of a carrier-plate, the pieces will be drawn down into the exhaust-trunk clear of the path of the next series of splints to be brought up into position in front of the carrier-chain by the transfer-chains. The passage of air on its way to the exhaust-trunk downward between the splints resting in the notches of the transfer-chain will also tend to hold the splints seated in such notches until the lifter raises them therefrom.

From the described splint-setting devices the carrier-chain E passes upward past and beyond the guides E' E' to and over a pair of guiding and supporting wheels at T and then downward to a pair of octagonal wheels at T', having their peripheries formed with flat faces $t$ $t$ to engage the end portions of the plates of the carrier-chain. From wheels T' the carrier-chain passes to and over a drying-heater, (indicated at $T^2$,) which is for drying and heating the splints preparatory to the application of paraffin to them. From this heating device the carrier-chain passes to the paraffin-applying device, (indicated at $T^3$,) where portions of the splints are to be treated with paraffin. Beyond this paraffining device the carrier-chain carries the splints to and past the mechanism $T^4$ for applying the head-forming composition.

The splint heating, paraffining, and composition-applying devices can be of any desired construction and need not be described in detail in the present application, as their construction can be varied as desired without involving any departure from the invention forming the subject-matter of the claims of this application. As these devices are indicated in the drawings they are of the same relative arrangement and can be of the same construction as the corresponding devices or mechanisms shown and described in the prior United States patent hereinbefore referred to.

Having passed the composition-applying mechanism, the carrier-chain, with the headed splints, passes up over a pair of guide-wheels at $T^5$ and thence to and over guides at $T^6$, from which it is to pass over and under a series of pairs of guiding and supporting wheels to give the composition forming the heads on the splints a chance to cool, dry, and harden. If desired, the number of these guiding and supporting wheels can be made large enough to give the carrier-chain sufficient travel before it reaches the discharging mechanism to afford time for the match-heads to get quite dry and hard enough to allow of immediate boxing of the matches as discharged from the machine. After leaving the series of guiding and supporting wheels the carrier-chain travels back over guides, (indicated at $T^7$ $T^7$,) to and over a pair of wheels at $T^8$, from which it passes to and over another pair of wheels at $T^9$, and then down to the discharging mechanism for punching the finished matches out of the perforations of the chain-plates. The movement of the carrier-chain to and past this discharging mechanism is an intermittent or step-by-step one, caused by the engagement of the intermittently-driven gear-wheels $D^5$, meshing with the plate-teeth. The position of one pair of such gear-wheels is indicated at $T^{10}$ in Fig. 1 and another at $T^{11}$. Such wheels are to be driven, as indicated, by belts or sprocket-chains $T^{12}$ and $T^{13}$, respectively, driven from a rotating part from which the composition-applying mechanism $T^4$ is driven, the object being to have the travel of the match-splint ends when in contact with the composition on roller $T^{14}$ of the same rate as that of the layer of composition into which the splint ends extend.

To allow for the difference in travel of the carrier-chain as it passes through the main part of the machine and past the sticking and discharging devices and as it travels out through the rest of the machine and back, there are slack portions in the chain between the two sets of guide-wheels T⁸ and T⁹ and between the guide-wheels at T and the octagonal wheels at T'.

The match-discharging mechanism for ejecting the finished matches from the carrier-plates is situated so as to act upon the matches held in a carrier-chain plate which is held between the toothed wheels D⁵ D⁵ and the guides E' E'. Such mechanism consists of a reciprocating head U, supported on guides u' u', so as to be movable toward and from the back of a carrier-chain plate held between the wheels D⁵ D⁵ and guides E' E', its movement being in a plane at right angles to such plate. This head carries a series of punch-pins u u, of the same number as the perforations e e, in a row on the carrier-chain plates, the pins being so situated on the head that each one will be opposite one of the plate-perforations when the carrier-chain has come to rest and is held from movement by the gear-wheels D⁵ D⁵ as the latter are locked from movement by one of the hereinbefore-described locking bars or bolts engaging a toothed wheel on their shaft.

The head U is connected with the two actuating-rods U² U², which at their other ends are pivotally connected with the arms U³ U³ on the rock-shaft U⁴, journaled in suitable bearings on the frame A A. Attached to this shaft is an arm U⁵, to the outer end of which is pivoted by pin u² the end of the rod U⁶, the other end of which is connected with a longitudinally-slotted plate U⁷, supported and guided on the shaft B⁵ by its slot u³ engaging the latter. This plate carries a bearing u⁴, preferably but not necessarily a roller, engaging a cam-groove u⁵ in the cam U⁸, fixed upon shaft B⁵. The shape of this cam-groove is such that the rod U⁶ will at a certain point in the revolution of shaft B⁵ be quickly moved outward and retracted, so that the rock-shaft U⁵ will be rocked to move the head U quickly toward the carrier-chain plate to cause the ejector-pins u u to push the matches in front of them out from between the clamping-fingers e⁶ e⁶ and the plate-perforations e⁵ e⁵ and then to return the head to its normal retracted position.

The cam U⁸ is so arranged on the shaft B⁵ that the described movements of the head U will be caused to take place and be completed while the carrier-chain is at rest and the shaft D⁴, carrying the wheels D⁵ D⁵, is locked by the described locking mechanism.

The shaft B⁵ carries fixed upon it the sprocket-wheel B⁷, engaging and driving the sprocket-chain B⁸, which passes around and drives the second sprocket-wheel B⁹, fixed on shaft B¹⁰, which is journaled in suitable bearings on frame A A and carries also fixed upon it a pinion W, meshing with and driving gear-wheel W' on shaft W², journaled in bearings on frame A A and carrying a sprocket-wheel W³, engaging a sprocket-chain W⁴, which runs to and drives the sprocket-wheel W⁵, which is, as indicated in Fig. 1 of the drawings, to be connected by gearing with the rotating part from which the sprocket chains or belts T¹² and T¹³ are driven, and which is to actuate the chain or belt T¹⁵, running to and actuating the composition-applying mechanism.

The operation of my machine, with its parts constructed and operating as hereinbefore set forth, and shown in the drawings, is as follows: With power applied to drive the main driving-shaft B, the clutch-lever I¹² moved into position to keep the clutch I⁷ I⁸ in operative position to connect shafts B⁵ and I⁵ together, the hopper G supplied with splints or matchsticks g g, and the exhaust-pump in operation the feed-drum G⁵ will be rotated continuously to carry its periphery through the bottom of the hopper under the mass of splints in the latter, and the suction or exhaust device will draw the air downward from the hopper through the openings in the periphery of the upper part of the drum, such openings consisting of the spaces between the ribs g⁴ g⁴, forming portions of the periphery of the drum, and the larger openings between the adjoining ends of the series of ribs and the raised portions or ribs g⁵ g⁵ on the drum end. As the drum revolves the splints in the hopper, if straight and parallel with the spaces between the ribs g⁴ g⁴, will drop into the latter and be seated therein with portions near their opposite ends resting upon the drum ends, their upper sides being then substantially flush with the upper or outer faces of the ribs g⁴ g⁴ between the splint-receiving spaces. The ribs, with the splint-receiving spaces between them and the portions of the drum ends adapted to support the splints between the ribs, form, in effect, pockets with most of their bottoms open. Without the suction device the splints, if properly situated in the hopper, will tend to drop into place in the drum-pockets, but the action of the suction is to draw them quickly and squarely down in place between the pocket sides, so that with the splints in the lower part of the hopper arranged parallel to the drum-ribs the drum-pockets will be certain to be completely filled before such pockets are by the movement of the drum carried outward beyond the hopper front. While the drum is rotating the back G⁶ of the hopper is given a constant swinging movement by the crank-and-pitman mechanism described, which movement by jarring the mass of splints tends to straighten them in the hopper, so that they will be in a position at right angles to the swing of the back, and consequently parallel to the ribs and pockets of the feed-drum, and to shake them down into such pockets. The alternate packing together and loosening of the splints at and near the bottom of the hopper, caused by the swinging back, assist very greatly to insure the falling of the splints into the drum-pockets. The rapidly swinging and rising pairs of kicking clearers H² H² act to kick backward and inward any splints not seated in the drum-pockets, but tending to move forward and outward with the periphery of the drum. With the pair of clearers moved quickly, and having, when they engage the splints, not only a rearward, but an upward movement, the splints will be most easily cleared back and kept from any possible packing at the exit from the hopper to clog or interfere with the free travel of the drum-periphery out of the hopper. The kicking or striking of the splints by these clearers at corresponding points on opposite sides of the middle of the sticks also serves to jar the mass of splints and straighten any splint or splints which may be crooked in the hopper or out of parallel with the other splints and the feed-drum pockets. Any short splints, pieces, or slivers which may be in the hopper will, as they reach the bottom of the latter, be drawn by the action of the suction device down through the openings in the drum periphery, either between the ribs or between the ends of the series of ribs, into the interior of the drum, whence they will be drawn outward and downward into the suction-trunk, either through the openings $g^3$ $g^3$ in the drum ends or through the openings in the drum's periphery, which may be on the lower side of the drum. Any splints which may be too crooked in the hopper to be straightened by the action of the swinging hopper back and the clearers H² H² will work down and out of the hopper through the large openings in the periphery of the drum which are between the series of ribs $g^4$ $g^4$ and will be drawn out into the suction-trunk through the openings $g^3$ $g^3$. From this suction-trunk the splints, pieces, chips, and slivers removed from the hopper will be carried to and discharged through the discharge pipe or trunk of the pump or fan.

With the above-described arrangement and operation of parts the lower portion of the hopper will be kept free of short splints, pieces of splints, slivers, chips, &c., which would otherwise interfere with the entrance of the splints into the drum-pockets or prevent their being properly seated in the latter, and there will be no necessity for stopping the machine and removing the contents of the hopper in order to get access to and remove the clogging material from the lower part of the hopper, as in the case of match-making machines heretofore made employing a notched or grooved drum to take splints from a hopper.

In my machine all of the short sticks, pieces, chips, slivers, &c., which work down to the bottom of the hopper are at once taken out of the way of the good splints, and even whole splints, if so crooked as to interfere with the access of the rest of the hopper contents to the pockets of the feed-drum, will be removed through the larger openings in the drum-periphery, so that the feeding of the splints by the drum can go on uniformly, the pockets being filled with splints, while in the old grooved drum and hopper machines a splint getting or being put crooked in the hopper, so as to stand at much of an angle to the drum pockets or grooves, would so interfere with the passage of the splints into the drum as to necessitate the removal of the hopper contents for the taking out or straightening of such splint before the work of the machine could go on. An exit for small chips and splinters from the hopper is also provided on each side of the feed-drum, where there is a space between the drum end and the adjacent plate G³, such space having for its bottom one of the curved plates S S.

As the feed-drum G⁵ revolves the splints contained in the pockets thereof will be carried out from under the hopper and then downward to a point opposite the transfer-drum, into the notches or pockets of which they are caused to pass by the guide-plates K² K² engaging their ends projecting beyond the sides or ends of the feed-drum.

The transfer-drum, which like the feed-drum is constantly rotating while the clutch mechanism remains in operation to connect shafts B⁵ and I⁵, carries the splints, held in its pockets or notches by the guide-plates K² K², onward and downward to a point over the transfer-chains M M, where the splints are, because of the bending downward of plates K² K², free to drop into the notches $m$ $m$ of such chains. To insure the shifting of the splints into such notches from the pockets or notches of the transfer-drum, the upturned ends of guide-plates K³ K³ are arranged to present downwardly and forwardly inclined faces to the ends of the splints projecting beyond the ends of the feed-drum. The shifting of the splints and their secure seating in the notches of the transverse chains are thus insured.

With the feed-drum constructed as described, with the two series of fifty-one splint-receiving pockets separated by unpocketed portions of the periphery provided with raised portions or ribs $g^5$ $g^5$, extending circumferentially along parts of the drum end, the feeding of the splints to the transfer-drum will be intermittent, there being a cessation of the feed for a time at the end of the delivery of each series of fifty-one sticks or splints. This causes a corresponding cessation of delivery of the sticks or splints to and into the notches $m$ $m$ of the transfer-chains M M. During such cessation the latter chains are at rest because of the tripping of the pawl $r^2$ to disengage it from the ratchet-wheel R, fixed on the shaft M³ of the roller M′, which supports and actuates the transfer-chain, this tripping of the pawl being caused by the engagement of the trip-arm $r^3$ on the rock-shaft $r'$, carried by the rotating gear-wheel R′, with the trip-lug $r^4$ on the trip-disk R³, supported and moved as hereinbefore described. These pawl-tripping devices are so limited in their action as to disconnect the transfer-chain-actuating roller M' from its driving mechanism and leave it at rest during each intermission in the feed of splints to the chain caused in the manner and by the arrangement above indicated. The transfer-chains will then start to move forward after each intermission just as the first splint of a new series is fed into those notches $m\ m$ in the two chains M M which are next to the last ones of the chain-notches filled by the previous feeding of splints from the feed-drum and transfer-drum.

Each forward movement of roller M' is just sufficient to move the transfer-chains through the distance of a number of their notches $m\ m$ equal to the number of the splint-receiving pockets in each series on the feed-drum. Each forward movement of the transfer-chains will then bring a new series of fifty-one of their splint-holding notches into position in front of the carrier-chain E, the position of which with relation to the transfer-chains is such that the latter will stop with each splint carried by them about in line with the line of travel of one of the perforations $e^5$ in the carrier-chain plates.

Each step-by-step movement of the carrier-chain caused by the mechanism hereinbefore described takes place during the travel of the transfer-chains, the carrier being brought to rest, so that each time that the carrier-chain stops a new row of the plate-perforations $e^5$ $e^5$ will be brought into position just above the plane of the inner ends of the splints held in the notches of the transfer-chains. The carrier-chain is then locked from movement by the locking bolt-rods $F^3$ $F^3$ engaging the teeth of toothed wheels F F on the shafts D $D^4$, which carry the pairs of toothed wheels $D^2$ $D^2$ $D^5$ $D^5$, respectively, which mesh with the teeth on the carrier-plates, the bolt-rods being moved into and held in wheel-locking position by the action of the cam $F^5$ on the lever $F^2$. The splints which are in the notches of the stopped transfer-chains in front of the carrier-chain are acted upon by the suction through the exhaust-trunk $S^5$ and slot $M^8$, so that they will be kept securely seated in the chain-notches. The downdraft of air will also free the splints of any loose chips and pieces and will carry off any short or broken splints.

With the carrier-chains stopped and locked as the transfer-chains come to rest the cams $N^5$ $N^5$ on the main cam-shaft $B^5$ actuate the levers $N^3$, so as to raise the heads N' N' and the notched lifter-plates N N carried thereby quickly a sufficient distance to take the splints from the notches $m\ m$ of the chains and hold them supported by the bottoms of the plate-notches $n\ n$ in position directly opposite a row of perforations $e^5$ $e^5$ in a plate of the carrier-chain.

The movement of the lifter is so guided that the bottoms of its notches will always travel in lines exactly opposite the lines of travel of the perforations in a row on a carrier-plate, as such plate is moved along with the travel of the carrier-chain, and is of such extent that each notch $n$ will, when the lifter reaches its highest position, be directly opposite one of the plate-perforations, so that a splint supported in corresponding notches in the two lifter-plates N N will be in line with such perforation, so that if it is moved endwise it will enter the latter.

The sides of the notches $n\ n$ are preferably inclined upward and outward, as shown, so that the splints will be properly taken from the notches $m\ m$ of the transfer-chains and seated in the notches $n\ n$, even if the chain-notches or the splints supported therein should not be exactly in the same vertical planes with the bottoms of notches $n\ n$. As the lifter rises quickly to its uppermost position the splints, taken thereby from the transfer-chain pockets or notches, come under the guard-frame $O^7$ on the beater-bar, which is to prevent the splints from jumping out of the lifter-notches. The beater-bar is then moved quickly toward the carrier-chain by the action of cams $O^2$ upon the bearings on levers $O^3$ $O^3$, connected with the bar by the links $O^4$ $O^4$, so as to strike the outer ends of the splints which are on the lifter and drive the splints forward, so that their inner ends will be passed through the plate-perforations $e^5$ $e^5$ into the grasp of the respective pairs of spring clamping-fingers $E^2$ $E^2$ on the back of the carrier-plate. The guard-frame $O^7$ effectually prevents any jumping of the splints away from the bottoms of notches $n\ n$ as the beater-bar strikes and drives the splints inward. The guide-slots $p\ p$ in guide-plate P, with their countersinks $p'\ p'$, serve to guide the inner or forward ends of the splints, so as to prevent any chance striking of the splint ends against the carrier-plate on one side or the other of the respective perforations $e^5$ $e^5$, which they are to enter. While this setting or sticking of the splints into the perforations of the carrier-chain plate is going on the carrier-chain being held stationary, as hereinbefore described, the discharging mechanism is acting to eject a row of finished matches from the carrier-chain at the point where such chain is held between guides E' E' and the toothed wheels $D^5$ $D^5$. For this purpose the cam-groove $u^5$ in cam $U^8$, engaging the bearing pin or roller $u^4$ on the slotted plate $U^7$, moves such plate and the connected rod $U^6$ quickly outward and then back. This, through the connection of the rod with the arm $U^5$, rocks the rock-shaft $U^4$ and swings the arms $U^3$ $U^3$ on such shaft to move the rods $U^2$ $U^2$ forward and back to carry the head U toward and from the carrier-chain E. This movement of the head causes the punch-pins $u\ u$, carried by the latter, to quickly pass between the respective pairs of spring clamping-fingers $E^2$ $E^2$ and out through the perforations $e^5$ $e^5$, pushing the inner ends of the matches before them clear of the carrier-plate and then return to their normal retracted position, the return of the head U being quick enough to clear the pins not only from the plate-perforations $e^5$ $e^5$, but from the clamping-fingers $E^2$ $E^2$ before the carrier-chain is again moved forward. The beater-bar O is by the action of the springs $O^5$ $O^5$ upon the levers $O^3$ $O^3$ returned quickly to its normal retracted position after the high parts $o'$ $o'$ of the lever-actuating cams $O^2$ pass the bearings $o^2$ $o^2$ on the levers, and the lifter is quickly depressed by the action of springs $N^6$ $N^6$ upon its levers $N^3$ $N^3$ when the cams $N^5$ $N^5$ have released the lever ends, as they do before the transfer-chains are caused to move again, because of the reëngagement of the pawl $r^2$, carried by the rotating driving gear-wheel $R'$, with the ratchet-wheel R on the shaft $M^3$ of roller $M'$, such reengagement being caused by the pawl-spring $r^6$ after the trip-arm $r^3$ has passed off of the trip-lug $r^4$. Just as the new forward movement of the transfer-chains begins the feed of the splints into the chain-notches, which has stopped for a while because of the non-delivery of splints to the transfer-drum, while one of the unpocketed portions of the feed-drum periphery is passing the transfer-drum, also commences again. The transfer-chains now move far enough to bring a new series of fifty-one splint-carrying notches $m$ $m$ in front of the carrier-chain and then stop because of the pawl $r^2$, being again tripped out of engagement with ratchet-wheel R by the trip-lug $r^4$ on trip-disk $R^3$, engaging the trip-arm $r^3$ on the pawl-carrying rock-shaft $r'$. While this new movement of the transfer-chains is going on the cam $F^5$ is turned to take its higher part out of engagement with the bearing on locking-lever $F^2$, and the spring $F^4$ swings such lever to withdraw the bolt-rods $F^3$ $F^3$ from the respective toothed wheels F F, so as to leave shafts D and $D^4$ and the pairs of toothed wheels $D^2$ $D^2$ and $D^5$ $D^5$ thereon free to turn. The eccentric $B^6$ on the same shaft $B^5$ with cams $O^2$, $O^2$, $U^8$, $U^5$, $U^5$, and $F^5$ then actuates the strap C and rod $C'$, so as to rock the disk $C^2$, and through the connecting-rod $C^3$ the disk $C^4$, to cause the pawls $c'$ and $c^4$, carried by such disks, respectively, to move the respective ratchet-wheels $D'$ and $D^2$ forward. This movement of the ratchet-wheels turns the shafts D and $D^4$ forward, so that their toothed wheels $D^2$ $D^2$ and $D^5$ $D^5$ cause the carrier-chain E to advance one step to bring a new row of perforations up opposite the place where the insertion of the splints is to be performed and a new row of perforations in another plate of the carrier-chain opposite the punch-pins $u$ $u$ of the match-discharging device. When the carrier-chain has been thus moved, the cam $F^5$ swings the lever $F^2$ to cause the bolt-rods to lock the wheels F F and consequently the shafts D and $D^4$ with their toothed wheels $D^2$ $D^2$ $D^5$ $D^5$, so that the carrier-chain is held immovable in either direction after said chain has been so locked and the transfer-chains have moved to bring a new series of splints in front of a plate of the carrier-chain and have come to rest because of the described tripping of the pawl of the stop mechanism connecting the shaft $M^3$ of the transfer-chain-actuating roller $M'$ with the means for driving the same. The cams $N^5$ $N^5$ then raise the lifter to lift the new series of splints out of the notches of the transfer-chains, and the cams $O^2$ $O^2$, with their projections $o'$ $o'$, actuate the levers $O^3$ $O^3$ to cause the beater-bar O to drive the raised splints into the row of perforations $e^5$ $e^5$ opposite them in the carrier-chain plate. As the eccentric $B^6$, cam $F^5$, and cams $N^5$ $N^5$, $O^2$ $O^2$, and $N^8$ are all carried by and rotate with the shaft $B^5$ the movements of the carrier-chain-moving devices, the locking mechanism for the same, the means for actuating the lifter, the means for moving the beater-bar, and the means for actuating the discharging or ejecting head can readily be properly timed relatively and will always then take place at the proper times as the shaft $B^5$ is revolved. The connection of this shaft directly and positively with the shaft $I^5$, which is the main driving-shaft for the mechanism which actuates the swinging back and the clearers of the hopper, and the driving mechanism for the feed-drum, the transfer-drum, and the transfer-chain-actuating roller $M'$ insures that the movements of the feed-drum, transfer-drum, and transfer-chains shall always, when properly timed with relation to the movement of the carrier-chain, lifter, beater-bar, and ejector or discharger remain so timed while the whole of the machine is in operation.

With the clutch device used for connecting shaft $B^5$ with shaft $I^5$ it is possible upon moving the lever $I^{12}$ so as to disconnect the clutch part $I^8$ from that part $I^7$ fast on shaft $I^5$ to stop the movements of the feed-drum, the transfer-drum, the transfer-chains, the swinging hopper-back, and the clearers, while leaving the rest of the machine in operation to complete the treatment of any splints already in the carrier-plates and cause the finished matches to be all ejected.

The operation of the paraffining and composition applying mechanisms, to and past which the splints held in the carrier-plates are carried, need not be described herein, as such mechanism may be of any desired suitable construction and operation without departure from my present invention.

While the machine constructed as hereinbefore described, and shown in the drawings, is especially intended for use with square sticks or splints, it can be employed to advantage in making matches from round or other shaped sticks. It has been found to work most successfully and continuously as long as the splints are supplied to the hopper.

With the described means and arrangement for straightening the splints in the hopper, clearing them back at the outlet of the hopper, and automatically removing from the hopper any crooked-lying splint and any short or broken splints, pieces, chips, or slivers it has been found that the pockets of the feed-drum, and consequently the notches of the transfer-chains, will always be well filled. The result of this uniform filling of the transfer-chain notches and of the action of the beater-bar and the means used for retaining the splints in such notches while the chains are being moved and the beater-bar is acting is that the splint receiving and holding devices of the carrier-chain are always most uniformly filled with splints.

Having thus described my invention, what I claim is—

1. In combination with a hopper for the splints and a traveling feeder with splint-receiving pockets, a swinging and reciprocating clearer, at or near the point where the feeder passes from the hopper, and means for swinging such clearer inward, with reference to the hopper, and raising it, substantially as and for the purpose specified.

2. In combination with a hopper for the splints and a traveling feeder with splint-receiving pockets, a clearer, at or near the point where the feeder leaves the hopper, having a pair of swinging and reciprocating plates, and means for swinging such plates inward, with reference to the hopper, and raising them, substantially as and for the purpose shown.

3. In combination with a hopper for the splints and a traveling feeder with splint-receiving pockets, a clearer, at or near the point where the feeder leaves the hopper, consisting of a series of pairs of swinging and reciprocating plates, and means for moving such pairs of plates successively inward and upward, with relation to the hopper contents, substantially as and for the purpose set forth.

4. In combination with a hopper for the splints and a traveling feeder with splint-receiving pockets, a clearer, at or near the point where the feeder leaves the hopper, having a plate supported so as to be capable of swinging and rising and falling motion, a rotary piece, and an eccentric on the latter engaging the plate, substantially as and for the purpose described.

5. In combination with a hopper for the splints and a traveling feeder with splint-receiving pockets, a clearer, at or near the point where the feeder leaves the hopper, having a pair of plates supported so as to be capable of both a swinging and a rising and falling motion, a rotary piece, and a pair of eccentrics thereon engaging and actuating the plates, substantially as and for the purpose specified.

6. In combination with a hopper for the splints and a traveling feeder with splint-receiving pockets, a series of pairs of plates, at or near the point where the feeder leaves the hopper, means for supporting such plates, so that they can swing and rise and fall, a rotary shaft, and a series of pairs of eccentrics thereon engaging and actuating the plates, substantially as and for the purpose shown.

7. In combination with a hopper for the splints and a traveling feeder with splint-receiving pockets, a series of pairs of plates, at or near the point where the feeder leaves the hopper, means for supporting such plates, so that they can swing and rise and fall, a rotary shaft, and a series of pairs of eccentrics thereon engaging and actuating the pairs of plates, the pairs of eccentrics being differently arranged on the shaft, with reference to the rotation of the latter, substantially as and for the purpose set forth.

8. In combination with a hopper for the splints, and a traveling feeder with splint-receiving pockets, a pair of clearer-plates, at or near the point where the feeder leaves the hopper, having slots, a rod engaging such slots, a rotary shaft and a pair of eccentrics thereon, engaging and actuating the plates, substantially as and for the purpose described.

9. In combination with a hopper for the splints, and a traveling feeder with splint-receiving pockets, a series of pairs of plates, at or near the point where the feeder leaves the hopper, each having a slot, a rod engaging the slots in the plates, a rotary shaft and a series of pairs of eccentrics on the shaft engaging and actuating the plates, the different pairs of eccentrics being situated on the shaft so that their portions of greatest eccentricity are in different planes radial from the axis of the shaft, substantially as and for the purpose specified.

10. In combination with a source of supply of splints, a traveling feeder, for taking the splints from such source of supply, having a series of separate parallel splint-receiving pockets, having portions upon which the splints can rest, sides extending across between the splint-supporting portions, and elongated openings in their bottoms extending between the splint-supporting portions, substantially as and for the purpose shown.

11. In combination with a hopper for the splints, a traveling feeder, for taking the splints from the hopper, having a series of splint-receiving pockets, and an unpocketed portion adapted to be moved under and past the drum by the motion of the feeder, substantially as and for the purpose specified.

12. In combination with a hopper for the splints, a traveling feeder for taking the splints from the hopper, having several series of splint-receiving pockets and intervening unpocketed portions, substantially as and for the purpose shown.

13. In combination with a hopper for the splints, a traveling feeder for taking the splints from the hopper, having a series of splint-receiving pockets, and an opening beyond the series of pockets, having at its sides portions of the feeder to support the splints in the hopper at or near the ends of the splints, substantially as and for the purpose set forth.

14. In combination with a hopper for the splints, a traveling feeder for taking the splints from the hopper, having portions to support the splints, and ribs extending between such portions, so as to form pockets or receptacles for the splints with bottoms open between the splint-supporting portions, to allow the passage of chips and pieces of splints, substantially as and for the purpose set forth.

15. In combination with a source of supply of splints, a rotary drum having a series of splint-receiving pockets, with elongated openings in their bottoms, and an exhaust device connected with such openings, substantially as and for the purpose specified.

16. In combination with a source of supply of splints, a hollow drum having a series of splint-receiving pockets with elongated openings in their bottoms, communicating with the interior of the drum, an exhaust device connected with such openings, and means for rotating the drum, substantially as and for the purpose set forth.

17. In combination with a source of supply of splints, a drum having a series of splint-receiving pockets having the end portions of their bottoms adapted to support parts of the splints, and elongated openings in their bottoms extending between such end portions and an exhaust device connected with such openings, substantially as and for the purpose specified.

18. In combination with a source of supply of splints, a traveling feeder, for receiving the splints therefrom, having a series of splint-receiving pockets with elongated openings in their bottoms, and an air-exhaust device connected with such openings on the side away from the source of supply of the splints, substantially as and for the purpose set forth.

19. In combination with a source of supply of the splints, a traveling feeder for taking the splints from the source of supply, having the portions to support the splints on opposite sides of their middle points, and the separate ribs, with the bottoms of the spaces between them open, extending between the splint-supporting portions of the feeder, an exhaust-trunk communicating with the spaces between the ribs, and an exhaust device connected with the trunk, substantially as and for the purpose described.

20. In combination with a hopper for the splints, a traveling feeder for taking the splints from the hopper, having a series of splint-receiving pockets with openings in their bottoms, and one or more large openings beyond the series of pockets, and an exhaust device connected with the openings in the feeder, substantially as and for the purpose specified.

21. In combination with a hopper for the splints, a traveling feeder with a series of pockets to receive the splints, and openings between such series, an exhaust device connected with such openings, when they are passing the hopper, substantially as and for the purpose shown.

22. In combination with a hopper for the splints, a traveling feeder having the series of splint-receiving pockets with openings in their bottoms, and the larger openings between the series of pockets, an exhaust device connected with such openings and those in the bottoms of the pockets, substantially as and for the purpose set forth.

23. In combination with a hopper for the splints, the hollow rotary feed-drum, having the two parallel ends, situated so as to form, with their peripheries, supports for the splints, and the series of separated parallel ribs, connecting the two ends, so as to form, with them, separate splint receiving and holding pockets for the splints with their bottoms open between the drum ends, substantially as and for the purpose described.

24. In combination with a source of supply of splints, a hollow feed-drum having the two parallel ends situated so as to form supports for different parts of the splints, and the series of ribs connecting the ends of the drum, so as to form, with them, pockets to receive and hold the splints, having their bottoms open between the drum ends and an exhaust device connected with the interior of the drum, substantially as and for the purpose specified.

25. In combination with a source of supply of splints, a moving carrier having portions to support the splints on opposite sides of their middle portions, ribs extending between the splint-supporting portions of the carrier, so as to form, with the latter, pockets to receive the splints, having their bottoms open between the drum ends and an exhaust device connected with the spaces between such ribs, substantially as and for the purpose described.

26. In combination with a hopper for the splints, the hollow rotary feed-drum having the two ends with several series of ribs extending across between such ends, to leave, between the ribs, splint-receiving spaces with openings in their bottoms, circumferentially-extending ribs on the drum ends, between the series of ribs, and openings in the drum-periphery, between such circumferentially-extending ribs, substantially as and for the purpose shown.

27. In combination with a hopper for the splints, the hollow rotary feed-drum having a series of splint-receiving pockets with portions to support the splints on opposite sides of the middle points of the latter, the side walls of the pockets extending across between the splint-supporting portions and the bottoms of the pockets, between such portions, left open, substantially as and for the purpose specified.

28. In combination with a hopper for the splints, the hollow rotary feed-drum having several series of splint-receiving pockets with openings in their bottoms, circumferential ribs between the series of pockets, and openings between such ribs, substantially as and for the purpose set forth.

29. In combination with a hopper for the splints, the hollow rotary feed-drum having a series of splint-receiving pockets with elongated clearing-openings in their bottoms, adapted to allow the passage of short splints or pieces of splints, and an exhaust device in communication with the interior of the drum, substantially as and for the purpose described.

30. In combination with a hopper for the splints, the hollow rotary feed-drum, having a series of splint-receiving pockets with portions of their bottoms adapted to support the splints on opposite sides of the middle points of the latter, and the remainder of the bottoms between such portions, open, and an exhaust device communicating with the interior of the drum, substantially as and for the purpose specified.

31. In combination with a hopper for the splints, the rotary drum having a series of splint-receiving pockets and an opening in its periphery beyond such pockets, and an exhaust device in communication with the interior of the drum, substantially as and for the purpose shown.

32. In combination with a hopper for the splints, the hollow rotary feed-drum having several series of splint-receiving pockets with portions of their bottoms left open, and large openings in its periphery between the series of pockets, and an exhaust device communicating with the interior of the drum, substantially as and for the purpose set forth.

33. In combination with a hopper for the splints, the hollow rotary feed-drum having the two ends, several separate series of ribs extending across between such ends, with the spaces between the ribs left open to the interior of the drum, circumferentially-extending ribs on the drum ends between the series of transverse ribs, and openings or spaces between such circumferentially-extending ribs, and an exhaust device communicating with the interior of the drum, substantially as and for the purpose described.

34. In combination with a hopper for the splints, the hollow rotary drum having openings in its sides or ends, and its periphery provided with splint-receiving pockets, with their bottoms between the drum ends open to the interior of the drum, a casing partially inclosing the drum, so as to form a chamber communicating with the opening in the drum ends, and an exhaust device having its trunk connected with such chamber, substantially as and for the purpose specified.

35. In combination with a hopper for the splints, the hollow rotary drum having openings in its ends, and its periphery provided with several series of splint-receiving pockets, with their bottoms between the drum ends open to the interior of the drum, and with openings between the series of pockets also communicating with the interior of the drum, a casing, in which the drum revolves, adapted to form a closed chamber with spaces on each side of the drum communicating with the openings in the drum ends, and a space through which the under side of the drum passes, and an exhaust device in communication with the interior of such casing, substantially as and for the purpose shown.

36. In combination with a hopper for the splints, the hollow rotary feed-drum having openings in its ends, and its periphery formed of two series of ribs extending between the drum ends, such series being separated by large spaces, such spaces, and those between the ribs being in communication with the interior of the drum and circumferentially-extending raised portions on the drum ends on opposite sides of such spaces, a casing inclosing the lower side of the drum, and having portions extending up on opposite sides of the drum, so as to form spaces or chambers on opposite sides of the drum, in communication only with the openings in the drum ends and the chamber below the drum, an exhaust device, and connections between the same and the latter chamber, substantially as and for the purpose set forth.

37. In combination with a hopper for holding match-splints, a rotating feed-drum having its periphery provided with a series of splint-receiving pockets and an unpocketed portion, an intermittently-traveling transfer-carrier, means for transferring the splints from the pockets of the drum to the transfer-carrier, and means for moving such carrier intermittently, substantially as and for the purpose specified.

38. In combination with a hopper for holding match-splints, a rotating feed-drum having its periphery provided with several series of splint-receiving pockets, with unpocketed spaces between the ends of such series, a transfer device to take the splints from the drum-pockets, an intermittently-traveling transfer-carrier receiving the splints from the transfer device, and means for intermittently moving the transfer-carrier, substantially as and for the purpose shown.

39. In combination with a hopper for holding match-splints, a rotating feed-drum having its periphery provided with a series of splint-receiving pockets, and an unpocketed portion beyond the end of such series, the rotary transfer-drum, the intermittently-traveling transfer-carrier receiving the splints from the transfer-drum, and means for moving such carrier intermittently, substantially as and for the purpose set forth.

40. In combination with a hopper for holding match-splints, the rotating feed-drum having its periphery provided with series of splint-receiving pockets separated by unpocketed portions, the transfer-drum having notches or pockets to receive the splints from the drum, the intermittently-traveling transfer-carrier having parallel portions provided with splint-receiving notches and means for intermittently moving such transfer-carrier, substantially as and for the purpose described.

41. In combination with a hopper for holding match-splints, the traveling feed device having series of splint-receiving pockets, and unpocketed portions between the ends of the series of pockets, a transfer device to take the splints from the feed-device pockets, the parallel transfer-chains provided with splint-holding notches to receive the splints from the transfer device, and means for intermittently moving such chains, adapted to move the chains only while the splints are being transferred to them from the feed device, substantially as and for the purpose specified.

42. In combination with a hopper for holding match-splints, the rotating feed-drum having its periphery provided with several series of splint-receiving pockets, and unpocketed portions between such series, the rotary transfer-drum having the notched disks to receive the splints, guides to shift the splints from the feed-drum to the transfer-drum, the two parallel transfer-chains having splint-holding notches, guides for shifting the splints from the transfer-drum into the notches of the chains, and means for moving such chains while the splints are being delivered to their notches, substantially as and for the purpose shown.

43. In combination with the notched transfer-carrier and the driving-roller for moving it, a toothed wheel rotating with such roller, a driven rotary wheel, a rock-shaft journaled thereon, carrying a pawl to engage the toothed wheel and a trip-arm, a rotary piece carrying a lug in the path of the trip-arm, and suitable gearing to give such piece a rotation in the same direction as that of the pawl-carrying wheel, but at a slower rate, substantially as and for the purpose specified.

44. In combination with the notched transfer-carrier and the driving-roller for moving it, a toothed wheel rotating with such roller, a driven rotary wheel carrying a rock-shaft provided with a pawl to engage the toothed wheel and a trip-arm, a rotary piece carrying a trip-lug in the path of the trip-arm, and worm-gearing for rotating the rotary piece in the same direction as the rotation of the pawl-carrying wheel, but at a slower rate, substantially as and for the purpose shown.

45. In combination with the notched transfer-chains, having teeth on their inner sides, the guides for such chains having rabbets to receive the chains and deeper rabbets to accommodate the chain-teeth, and guide-plates to keep the chains in the rabbets having overhanging flanges to engage the outer or upper sides of portions of the chains below the notched portions, substantially as and for the purpose specified.

46. The transfer-carrier, consisting of chains each formed of notched links pivotally connected together, and toothed guide-links pivotally connected with alternate notched links, and having their upper or outer edges lower than the notches of the links, substantially as and for the purpose shown.

47. In combination with a splint-conveying carrier having two parallel notched portions to support the splints, an exhaust-trunk communicating with an opening or throat situated between the notched portions of the carrier, and an exhaust device connected with such trunk, substantially as and for the purpose set forth.

48. In combination with a splint-conveying transfer-carrier consisting of two parallel endless flexible portions provided with splint-receiving notches, an exhaust-trunk communicating with an opening or throat between the two parts of the transfer-carrier, and an exhaust device connected with such trunk, substantially as and for the purpose described.

49. In combination with the transfer-chains provided with splint-receiving notches, the plate between such chains provided with a slot or elongated opening, an exhaust-trunk communicating with such opening, and an exhaust device connected with the trunk, substantially as and for the purpose specified.

50. In a match-making machine, in combination with a source of supply of the splints, a carrier to receive and hold the splints while being treated, a conveyer from which the splints are transferred to the carrier, having splint-receiving pockets, an exhaust device connected with the conveyer, so as to act to hold the splints down in the pockets thereof, and means for intermittently moving the conveyer in one direction, to convey the splints from the source of supply into position in front of the receiving and holding carrier, substantially as and for the purpose specified.

51. In a match-making machine, in combination with a carrier, to receive and hold the splints in rows while being treated, an intermittently-moving transfer-carrier having pockets to receive a row of splints, means for supplying a row of splints to such pockets, and means for intermittently moving the transfer-carrier, in one direction, to bring a row of splints carried thereby into position in front of the carrier, substantially as and for the purpose described.

52. In a match-making machine, in combination with a carrier to receive and hold the splints in rows while being treated, an intermittently-moving transfer-carrier having pockets to receive and hold the rows of splints, an air-exhaust device connected with the transfer-carrier, so as to act to hold the splints down in the pockets thereof, means for supplying splints to the pockets of the transfer-carrier, and means for intermittently moving the transfer-carrier in one direction, to cause it to bring rows of splints successively in front of the carrier, substantially as and for the purpose specified.

53. In a match-making machine, in combination with a carrier to receive the splints and hold them while they are being treated, means for moving such carrier with a step-by-step movement, a traveling endless conveyer to receive the splints from a source of supply and convey them to a position in front of the receiving and holding carrier, and means for moving such conveyer forward in one direction intermittently, substantially as and for the purpose specified.

54. In a match-making machine, in combination with a carrier to receive the splints, and hold them while they are being treated, a traveling endless conveyer, provided with splint-receiving notches adapted to receive the splints from a source of supply and convey them to a point in front of the splint receiving and holding carrier, and means for intermittently moving such notched conveyer in one direction, substantially as and for the purpose shown.

55. In a match-making machine, in combination with a carrier to receive the splints and hold them while they are being treated, the transfer device consisting of a pair of endless notched flexible carriers adapted to receive the splints from a source of supply and carry them to a point in front of the receiving and holding carrier and means for moving such transfer device intermittently in one direction, substantially as and for the purpose set forth.

56. In a match-making machine in combination with the carrier to receive the splints and hold them while they are being treated, the parallel notched transfer-chains to carry the splints to a point in front of the splint receiving and holding carrier, and means for moving such chains intermittently in one direction, substantially as and for the purpose described.

57. In a match-making machine in combination with a carrier provided with means to receive and hold the splints in rows, a moving transfer device to bring a row of splints in front of the carrier, a lifter to lift the splints from such transfer device, and means for driving the splints on the lifter into the splint receiving and holding devices on the carrier, substantially as and for the purpose specified.

58. In a match-making machine, in combination with a carrier provided with means to receive and hold the splints in rows, a transfer device adapted to hold match-splints in position parallel to each other, means for moving such device, to bring the splints in front of the splint receiving and holding carrier, a notched lifter, means for lifting the same to raise the splints from the transfer device, and means for forcing the splints supported on the lifter, into the splint receiving and holding devices of the carrier, substantially as and for the purpose shown.

59. In a match-making machine, in combination with a carrier provided with means to receive and hold the splints, a transfer device adapted to receive and hold a series of splints, means for moving such transfer device to carry the splints in front of the splint receiving and holding carrier, a notched lifter to lift the splints from the transfer device, means for raising the lifter, a beater to engage the splints on the raised lifter and force them into the splint receiving and holding devices of the carrier, and means for actuating such beater, substantially as and for the purpose set forth.

60. In a match-making machine, in combination with a carrier provided with means for receiving and holding match-sticks, the transfer device having the parallel notched portions, means for moving such transfer device intermittently, the lifter having the two parallel notched plates to take the splints from the transfer device, means for moving the lifter, and means for moving the splints on the raised lifter into the splint receiving and holding devices of the carrier, substantially as and for the purpose described.

61. In a match-making machine, in combination with a carrier provided with means to receive and hold the splints, the parallel transfer-chains with notches to receive splints, the lifter having the two notched plates to raise the splints from the chain-notches, and means for forcing the splints supported on the lifter into the splint receiving and holding devices of the carrier, substantially as and for the purpose specified.

62. In a match-making machine, in combination with a carrier provided with means to receive and hold the splints, the two parallel notched transfer-chains, means for moving them intermittently the lifter having the two parallel notched plates to lift the splints from the transfer-chains, means for actuating such lifter, a beater-bar to engage the splints on the raised lifter and force them into the splint receiving and holding devices of the carrier, and means for actuating such bar, substantially as and for the purpose shown.

63. In a match-making machine, in combination with a carrier provided with means to receive and hold the splints, the two parallel notched transfer-chains, means for moving them intermittently, the lifter having the two parallel notched plates to lift the splints from the transfer-chains, means for actuating such lifter, a beater-bar to engage the splints on the raised lifter and force them into the splint receiving and holding devices of the carrier, and means for actuating such bar, substantially as and for the purpose set forth.

64. In a match-making machine, in combination with a carrier provided with series of splint receiving and holding devices adapted to hold the splints in rows, means for moving such carrier with a step-by-step motion, a transfer device to bring a row of splints in front of the carrier, means for moving such device intermittently, a lifter to raise the splints from the transfer device, means for actuating the lifter, and a beater to force the row of splints on the raised lifter into a row of splint receiving and holding devices of the carrier, substantially as and for the purpose described.

65. In a match-making machine, in combination with a carrier provided with devices for receiving and holding splints, a rising-and-falling lifter to raise a series of splints into position opposite the receiving and holding devices of the carrier, means for forcing the splints so raised into said devices, and means for actuating the lifter, substantially as and for the purpose specified.

66. In a match-machine, in combination with a carrier provided with devices for receiving and holding splints, a rising-and-falling lifter to raise the splints up into position opposite the receiving and holding devices of the carrier, a beater-bar to force the splints from the lifter into such devices, having a guard to extend over the upper sides of the splints on the lifter, means for actuating the lifter, and means for actuating the beater-bar, substantially as and for the purpose shown.

67. In a match-making machine, in combination with a carrier provided with devices for receiving and holding splints, a rising-and-falling lifter having splint-holding notches, the beater-bar having a guard to extend over and close to the lifter when the latter is raised, means for actuating the lifter, and means for actuating the beater-bar, substantially as and for the purpose set forth.

68. In combination with the lifter having the splint-receiving notches, and means for raising and lowering it, the beater-bar made movable substantially at right angles to the travel of the lifter, and having a guard-frame attached to it extending over the lifter in position to keep any splints down in the notches of the lifter when the latter is raised, and means for actuating the beater-bar toward and from the lifter, substantially as and for the purpose described.

69. The splint-lifter, having the two reciprocating heads and the plates carried thereby having their upper edges notched, in combination with the levers, connections between the latter and the heads, cams to actuate the levers to raise the lifter, and one or more springs acting to lower it, substantially as and for the purpose specified.

70. The beater-bar supported on the two swinging arms in combination with the two levers, the links connecting the levers with the bar, the cams for actuating the levers in one direction, and one or more springs acting to swing the levers in the other direction, substantially as and for the purpose shown.

71. In a match-making machine, means for supplying the splints, a splint receiving and holding carrier, a beater-bar for driving the splints into the carrier, and means for movably supporting the same, in combination with the levers, the cams for actuating the same, and links connecting the levers with the bar made adjustable in length, substantially as and for the purpose set forth.

72. In a match-making machine in combination with a step-by-step-moving carrier having series of splint receiving and holding devices adapted to receive and hold the splints in rows, means for moving such carrier, the endless transfer-chains with splint-holding notches moving at right angles to the travel of the carrier means for moving such chains intermittently to bring successive rows of splints in front of the carrier, a lifter to lift such splints out of the chain-notches when the chains are at rest, means for actuating the lifter, a beater-bar to force the splints on the raised lifter into the splint receiving and holding devices on the carrier, and means for actuating such beater-bar, while the carrier is at rest between its step-by-step movements, substantially as and for the purposes specified.

73. As a means for holding and carrying match-splints, a carrier having an opening to closely surround and engage a portion of a splint, so as to form a steadying-support for the same, and clamping devices, secured outside of the opening, to engage only a part of the splint projecting beyond such opening, substantially as and for the purpose described.

74. As a means for holding and carrying match-splints, a carrier having an opening to closely surround and engage a portion of a splint so as to form a steadying-support for the same, and a pair of spring-clamps, secured outside of the opening, to engage the splints only beyond such opening, substantially as and for the purpose described.

75. As a means for holding and carrying match-splints, a carrier having a series of openings to surround and engage portions of the splints, so as to form a steadying-support for the same, and separate pairs of clamping devices, one pair for each opening, secured outside of the opening, to engage the splints only at a point beyond the opening, substantially as and for the purpose described.

76. In a carrier for match-splints, in combination with a plate provided with a series of openings, each adapted to closely surround and engage a splint, so as to form a steadying-support for a portion of the same, and clamping devices secured to the plate outside of the openings, engaging the splints only at points beyond the openings in the plate, substantially as and for the purpose described.

77. In a carrier for match-splints, in combination with a plate provided with a series of openings, each adapted to surround and engage the splints, so as to form a steadying-support for a portion of the same, and a series of pairs of spring clamping-fingers, one pair for each opening in the plate, such fingers being secured upon the back of the plate, and adapted to engage the splints only at a point beyond the openings in the plate, substantially as and for the purpose described.

78. In a carrier for match-splints, in combination with a plate having an opening to receive and inclose a portion of a splint so as to form a steadying-guide therefor, a pair of spring clamping-pieces on the back of the plate, having their opposing faces grooved, substantially as and for the purpose shown.

79. In a carrier for match-splints, in combination with a plate having a series of openings to receive and inclose portions of the splints and form steadying-guides therefor, a series of splint-clamping devices on the plate, having their opposing faces grooved, arranged to receive and hold portions of the splints beyond the plate, substantially as and for the purpose set forth.

80. In a carrier for match-splints, in combination with a main plate having rows of openings to receive and inclose portions of splints, plates attached to the main plate between rows of openings therein, and having portions standing out from the main plate split or cut so as to form independently-movable splint-engaging spring-fingers, substantially as and for the purpose described.

81. In a carrier for match-splints, in combination with a plate having rows of openings to receive and inclose portions of the splints, plates fastened to the main plate between the rows of openings, having upturned portions close to the sides of the adjoining rows of openings, grooved and split, or cut to form separate splint-clamping fingers with grooves in their splint-engaging sides, substantially as and for the purpose specified.

In testimony that I claim the foregoing I have hereunto set my hand this 7th day of May, A. D. 1896.

JACOB P. WRIGHT.

Witnesses:
L. A. BEECHER,
H. DAYTON STANNARD.